US011937331B2

(12) United States Patent
Feuersaenger et al.

(10) Patent No.: US 11,937,331 B2
(45) Date of Patent: *Mar. 19, 2024

(54) TECHNOLOGIES FOR CONTROLLING DISCONTINUOUS RECEPTION OPERATION

(71) Applicant: Apple Inc., Cupertino, CA (US)

(72) Inventors: Martin Feuersaenger, Bremen (DE); Christian Wengerter, Kleinheubach (DE); Joachim Loehr, Wiesbaden (DE); Alexander Golitschek Edler von Elbwart, Darmstadt (DE)

(73) Assignee: Apple Inc., Cupertino, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/568,607

(22) Filed: Jan. 4, 2022

(65) Prior Publication Data

US 2022/0183102 A1   Jun. 9, 2022

Related U.S. Application Data

(63) Continuation of application No. 16/590,788, filed on Oct. 2, 2019, now Pat. No. 11,240,870, which is a
(Continued)

(30) Foreign Application Priority Data

Jan. 26, 2012   (EP) .................................... 12000505

(51) Int. Cl.
*H04W 76/28* (2018.01)
*H04L 5/00* (2006.01)
(Continued)

(52) U.S. Cl.
CPC ......... *H04W 76/28* (2018.02); *H04L 27/2602* (2013.01); *H04W 52/0216* (2013.01);
(Continued)

(58) Field of Classification Search
CPC .......... H04L 27/2602; H04W 52/0216; H04W 52/0225; H04W 72/23; H04W 76/28
See application file for complete search history.

(56) References Cited

U.S. PATENT DOCUMENTS 7,916,675 B2   3/2011   Dalsgaard et al.
8,085,694 B2   12/2011  Wu et al.
(Continued)

FOREIGN PATENT DOCUMENTS

CN   101473684   7/2009
CN   101541067   9/2009
(Continued)

OTHER PUBLICATIONS

3rd Generation Partnership Project; Technical Specification Group Radio Access Network; Evolved Universal Terrestrial Radio Access (E-UTRA); Medium Access Control (MAC) Protocol Specification (Release 10), 3GPP TS 36.321 V 10.4.0, Dec. 2011, 54 pages.
(Continued)

*Primary Examiner* — Melanie Jagannathan
(74) *Attorney, Agent, or Firm* — Kilpatrick Townsend & Stockton LLP

(57) ABSTRACT

The disclosure relates to methods for improving the DRX operation of a UE by introducing an additional DRX wake-up cycle, which runs in parallel to the short and/or long DRX cycle. The DRX wake-up cycle defines time intervals after which the UE starts monitoring the PDCCH for a wake-up duration of time; the UE does not perform any other operation during the wake-up duration apart from monitoring the PDCCH. The time intervals of the wake-up cycle between the wake-up durations are preferably shorter than the one of the DRX long cycle, and may have the same or a shorter length than the ones of the DRX short cycle. The wake-up duration may be as long as the on-duration of the DRX (Continued)

short/long cycle, or may be preferably much shorter, such as only one or a few subframes.

20 Claims, 13 Drawing Sheets

Related U.S. Application Data continuation of application No. 15/965,279, filed on Apr. 27, 2018, now Pat. No. 10,477,614, which is a continuation of application No. 15/469,118, filed on Mar. 24, 2017, now Pat. No. 9,986,592, which is a continuation of application No. 15/164,755, filed on May 25, 2016, now Pat. No. 9,642,181, which is a continuation of application No. 14/372,716, filed as application No. PCT/EP2012/073463 on Nov. 23, 2012, now Pat. No. 9,386,524.

(51) Int. Cl.
    H04L 27/26     (2006.01)
    H04W 52/02    (2009.01)
    H04W 72/23    (2023.01)

(52) U.S. Cl.
    CPC ....... H04W 52/0225 (2013.01); H04W 72/23 (2023.01); *H04L 5/0048* (2013.01); *Y02D 30/70* (2020.08)

(56) References Cited

U.S. PATENT DOCUMENTS

| | | | |
|---|---|---|---|
| 8,432,843 | B2 | 4/2013 | Cai et al. |
| 8,621,534 | B2 | 12/2013 | Zou et al. |
| 9,088,950 | B2 | 7/2015 | Cai et al. |
| 9,100,914 | B2 | 8/2015 | Wanstedt et al. |
| 9,131,447 | B2 | 9/2015 | Cal et al. |
| 9,386,524 | B2 | 7/2016 | Feuersaenger et al. |
| 9,642,181 | B2 | 5/2017 | Feuersaenger et al. |
| 9,986,592 | B2 | 5/2018 | Feuersaenger et al. |
| 10,477,614 | B2 | 11/2019 | Feuersaenger et al. |
| 11,240,870 | B2 | 2/2022 | Feuersaenger et al. |
| 2007/0291728 | A1 | 12/2007 | Dalsgaard et al. |
| 2009/0238098 | A1 | 9/2009 | Cai et al. |
| 2009/0238105 | A1 | 9/2009 | Wu et al. |
| 2009/0285141 | A1 | 11/2009 | Cai et al. |
| 2009/0310503 | A1 | 12/2009 | Tenny et al. |
| 2010/0111019 | A1 | 5/2010 | Wu |
| 2010/0322173 | A1 | 12/2010 | Marinier et al. |
| 2011/0099753 | A1 | 5/2011 | Preschke et al. |
| 2011/0199910 | A1* | 8/2011 | Oh ................... H04W 52/0229 370/241 |
| 2011/0294491 | A1 | 12/2011 | Fong et al. |
| 2012/0014304 | A1 | 1/2012 | Cai et al. |
| 2012/0044847 | A1 | 2/2012 | Chang |
| 2012/0066729 | A1 | 3/2012 | Zou et al. |
| 2012/0300685 | A1 | 11/2012 | Kim et al. |
| 2013/0084848 | A1 | 4/2013 | Dalsgaard |
| 2014/0056198 | A1 | 2/2014 | Quan et al. |
| 2014/0198701 | A1 | 7/2014 | Ostergaard et al. |
| 2014/0254451 | A1 | 9/2014 | Jamadagni et al. |
| 2014/0307606 | A1 | 10/2014 | Cai et al. |
| 2015/0131505 | A1 | 5/2015 | Dai |
| 2015/0351155 | A1 | 12/2015 | Cal et al. |
| 2017/0245213 | A1 | 8/2017 | Martinez Tarradell et al. |
| 2020/0383127 | A1* | 12/2020 | Zhu ...................... H04W 72/12 |
| 2021/0022202 | A1* | 1/2021 | Kim ...................... H04W 76/27 |

FOREIGN PATENT DOCUMENTS

| | | |
|---|---|---|
| CN | 102067683 | 5/2011 |
| EP | 2214442 | 8/2010 |
| EP | 2808794 | 12/2014 |
| JP | 2010517481 | 5/2010 |
| JP | 2011099753 | 5/2011 |
| JP | 2011520341 | 7/2011 |
| JP | 2011524713 | 9/2011 |
| JP | 6252870 | 12/2017 |
| WO | 2007148198 | 12/2007 |
| WO | 2008156339 | 12/2008 |
| WO | 2009132329 | 10/2009 |
| WO | 2009154414 | 12/2009 |
| WO | 2010044721 | 4/2010 |
| WO | 2010099753 | 9/2010 |
| WO | 2011099753 | 8/2011 |
| WO | 2011099753 | 1/2012 |
| WO | 2012157091 | 11/2012 |

OTHER PUBLICATIONS

3rd Generation Partnership Project; Technical Specification Group Radio Access Network; Evolved Universal Terrestrial Radio Access (E-UTRA); Multiplexing and Channel Coding (Release 10), 3GPP TS 36.212 V 10.4.0, Dec. 2011, 79 pages.
3rd Generation Partnership Project; Technical Specification Group Radio Access Network; Evolved Universal Terrestrial Radio Access (E-UTRA); Physical Channels and Modulation (Release 8), 3GPP TS 36.211 V 8.9.0, Dec. 2009, 83 pages.
3rd Generation Partnership Project; Technical Specification Group Radio Access Network; Evolved Universal Terrestrial Radio Access (E-UTRA); Requirements for Support of Radio Resource Management (Release 10), 3GPP TS 36.133 V 10.5.0, Dec. 2011, 544 pages.
3rd Generation Partnership Project; Technical Specification Group Radio Access Network; Feasibility Study for Evolved Universal Terrestrial Radio Access (UTRA) and Universal Terrestrial Radio Access Network (UTRAN) (Release 10), 3GPP TR 25.912 V 10.0.0, Mar. 2011, 64 pages.
Correction on UE Behaviour When DRX Cycle Changes, Samsung, 3GPP TSG-RAN2 Meeting #69bis, R2-102443, Apr. 12-16, 2010, 4 pages.
Go to Long Sleep Command for LTE-DRX, Research in Motion Ltd., R2-081868, 3GPP TSGRAN-WG2 Meeting #61 bis, Mar. 31-Apr. 4, 2008, 4 pages.
LTE Fast Dormancy, Intel Corporation, 3GPP TSG-RAN WG2#72, R2-106825, Nov. 15-19, 2010, 7 pages.
The Solutions of UE Battery Life Improvement and Signalling Reduction, Huawei, HiSilicon, 3GPP TSG-RAN WG2 #75b, R2-115000, Oct. 10-14, 2011, 2 pages.
U.S. Appl. No. 14/372,716, Non-Final Office Action, dated Oct. 8, 2015, 9 pages.
U.S. Appl. No. 14/372,716, Notice of Allowance, dated Feb. 26, 2016, 8 pages.
U.S. Appl. No. 15/164,755, Non Final Office Action, dated Oct. 5, 2016, 8 pages.
U.S. Appl. No. 15/164,755, Notice of Allowance, dated Dec. 29, 2016, 8 pages.
U.S. Appl. No. 15/469,118, Non-Final Office Action, dated Sep. 13, 2017, 6 pages.
U.S. Appl. No. 15/469,118, Notice of Allowance, dated Jan. 29, 2018, 8 pages.
U.S. Appl. No. 16/590,788, Non Final Office Action, dated Nov. 17, 2020, 6 pages.
U.S. Appl. No. 16/590,788, Notice of Allowance, dated May 17, 2021, 10 pages.
U.S. Appl. No. 16/590,788, Notice of Allowance, dated Sep. 10, 2021, 10 pages.
China Patent Application No. 201280071798.8, First Office Action, dated May 27, 2017, 15 pages.
China Patent Application No. 201280071798.8, Search Report, dated May 20, 2017, 2 pages.
China Patent Application No. 201810287611.7, Notice of Decision to Grant, dated Mar. 2, 2021, 1 page.
China Patent Application No. 201810287611.7, Office Action, dated Jul. 9, 2020, 3 pages.
China Patent Application No. 201810287611.7, Search Report, dated Jun. 30, 2020, 1 page.

(56) References Cited

OTHER PUBLICATIONS

European Patent Application No. 12000505.3, Extended European Search Report, dated Jul. 10, 2012, 8 pages.
European Patent Application No. 12788581.2, Notice of Decision to Grant, dated Feb. 20, 2020, 2 pages.
European Patent Application No. 20155304.7, Extended European Search Report, dated Mar. 9, 2020, 11 pages.
European Patent Application No. 20155304.7, Office Action, dated May 21, 2021, 6 pages.
Japan Patent Application No. 2014-553638, English Translation of Notice of Reasons for Rejection, dated Jun. 7, 2016, 7 pages.
Japan Patent Application No. 2014-553638, Notice of Decision to Grant, dated Nov. 7, 2017, 5 pages.
Japan Patent Application No. 2014-553638, Office Action, dated Jun. 7, 2016, 8 pages.
Japan Patent Application No. 2014-553638, Office Action, dated Dec. 20, 2016, 9 pages.
Japan Patent Application No. 2017-176734, Office Action, dated Jun. 19, 2018, 4 pages.
Japan Patent Application No. 2018-248320, Notice of Decision to Grant, dated Oct. 29, 2019, 5 pages.
International Patent Application No. PCT/EP2012/07346, International Preliminary Report on Patentability, dated Aug. 7, 2014, 10 pages.
International Patent Application No. PCT/EP2012/073463, International Search Report and Written Opinion, dated Jan. 15, 2013, 12 pages.
Sesia et al., LTE—The UMTS Long Term Evolution: From Theory to Practice, John Wiley & Sons, Ltd., ISBN: 978-0-470-69716-0, Chapters 9.3 and 13.6.1.1, 2009, 50 pages.
3rd Generation Partnership Project; Technical Specification Group Radio Access Network; Feasibility Study for Further Advancements for E-UTRA (LTE-Advanced) (Release 9), 3GPP TR 36.912 V 9.3.0, Jun. 2010, 61 pages.
European Patent Application No. 20155304.7, Office Action, dated Apr. 3, 2023, 5 pages.

* cited by examiner

US 11,937,331 B2

TECHNOLOGIES FOR CONTROLLING DISCONTINUOUS RECEPTION OPERATION

CROSS-REFERENCES TO RELATED APPLICATIONS

This application is a continuation of U.S. patent application Ser. No. 16/590,788, filed Oct. 2, 2019, which is a continuation of U.S. patent application Ser. No. 15/965,279, filed Apr. 27, 2018, which is a continuation of U.S. patent application Ser. No. 15/469,118, filed Mar. 24, 2017, which is a continuation of U.S. patent application Ser. No. 15/164,755, filed May 25, 2016, which is a continuation of U.S. patent application Ser. No. 14/372,716, filed Jul. 16, 2014, which is a 371 U.S. National Phase of PCT International Patent Application No. PCT/EP2012/073463, filed Nov. 23, 2012, which claims priority to European Patent Application No. 12000505.3, filed Jan. 26, 2012, which are hereby incorporated by reference in their entireties for all purposes.

BACKGROUND OF THE INVENTION

Technical Field

The disclosure relates to methods for improvements to the discontinuous reception operation of a mobile terminal. The disclosure is also providing the mobile terminal for performing the methods described herein.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC}, Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMES/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PON GW). For idle state user equipment, the SGW terminates the downlink data path and triggers paging when downlink data arrives for the user equipment. It manages and stores user equipment contexts, e.g., parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE (Release 8)

The downlink component carrier of a 3GPP LTE (Release 8) is subdivided in the time-frequency domain in so-called subframes. In 3GPP LTE (Release 8) each subframe is divided into two downlink slots as shown in FIG. 3, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consists of a number of modulation symbols transmitted on respective $N_{RB}^{DL} \times N_{sc}^{RB}$ subcarriers as also shown in FIG. 4.

Assuming a multi-carrier communication system, e.g., employing OFDM, as for example used in 3GPP Long Term Evolution (LTE), the smallest unit of resources that can be assigned by the scheduler is one "resource block". A physical resource block is defined as $N_{symb}^{DL}$ consecutive OFDM symbols in the time domain and $N_{sc}^{RB}$ consecutive subcarriers in the frequency domain as exemplified in FIG. 4. In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", version 8.9.0 or 9.0.0, section 6.2, available at http://www.3gpp.org and incorporated herein by reference).

The term "component carrier" refers to a combination of several resource blocks. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Further Advancements for LTE (LTE-A)

The frequency spectrum for IMT-Advanced was decided at the World Radiocommunication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced. Two major technology components are described in the following.

Carrier Aggregation in LTE-A for Support of Wider Bandwidth

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers (component carriers) are aggregated in order to support wider transmission bandwidths up to 100 MHz. Several cells in the LTE system are aggregated into one wider channel in the LTE-Advanced system which is wide enough for 100 MHz even though these cells in LTE are in different frequency bands.

All component carriers can be configured to be LTE Rel. 8/9 compatible, at least when the aggregated numbers of component carriers in the uplink and the downlink are the same. Not all component carriers aggregated by a user equipment may necessarily be Rel. 8/9 compatible. Existing mechanism (e.g., barring) may be used to avoid Rel-8/9 user equipments to camp on a component carrier.

A user equipment may simultaneously receive or transmit one or multiple component carriers (corresponding to multiple serving cells) depending on its capabilities. A LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain using the 3GPP LTE (Release 8/9) numerology.

It is possible to configure a 3GPP LTE-A (Release 10) compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may not be possible to configure a mobile terminal with more uplink component carriers than downlink component carriers.

In a typical TDD deployment, the number of component carriers and the bandwidth of each component carrier in uplink and downlink is the same. Component carriers originating from the same eNodeB need not to provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells). The characteristics of the downlink and uplink PCell are:

- The uplink PCell is used for transmission of Layer 1 uplinkcontrol information
- The downlink PCell cannot be de-activated, unlike SCells
- Re-establishment is triggered when the downlink Pcell experiences Rayleigh fading (RLF), not when downlink SCells experience RLF
- The downlink PCell cell can change with handover
- Non-access stratum information is taken from the downlink Pcell
- PCell can only be changed with handover procedure (i.e., with security key change and RACH procedure)
- PCell is used for transmission of PUCCH The configuration and reconfiguration of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover).

When a user equipment is configured with carrier aggregation there is one pair of uplink and downlink component carriers that is always active. The downlink component carrier of that pair might be also referred to as 'DL anchor carrier'. Same applies also for the uplink.

When carrier aggregation is configured, a user equipment may be scheduled over multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats, called CIF.

A linking between uplink and downlink component carriers allows identifying the uplink component carrier for which the grant applies when there is no-cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

LTE RRC States

LTE is based on only two main states: "RRC_IDLE" and "RRC_CONNECTED".

In RRC_IDLE the radio is not active, but an ID is assigned and tracked by the network. More specifically, a mobile terminal in RRC_IDLE performs cell selection and reselection—in other words, it decides on which cell to camp. The cell (re)selection process takes into account the priority of each applicable frequency of each applicable Radio Access Technology (RAT), the radio link quality and the cell status (i.e., whether a cell is barred or reserved). An RRC_IDLE mobile terminal monitors a paging channel to detect incoming calls, and also acquires system information. The system information mainly consists of parameters by which the network (E-UTRAN) can control the cell (re) selection process. RRC specifies the control signaling applicable for a mobile terminal in RRC_IDLE, namely paging and system information. The mobile terminal behavior in RRC_IDLE is specified in TS 25.912, e.g., Chapter 8.4.2 incorporate herein by reference.

In RRC_CONNECTED the mobile terminal has an active radio operation with contexts in the eNodeB. The E-UTRAN allocates radio resources to the mobile terminal to facilitate the transfer of (unicast) data via shared data channels. To support this operation, the mobile terminal monitors an associated control channel which is used to indicate the dynamic allocation of the shared transmission resources in time and frequency. The mobile terminal provides the network with reports of its buffer status and of the downlink channel quality, as well as neighboring cell measurement information to enable E-UTRAN to select the most appropriate cell for the mobile terminal. These measurement reports include cells using other frequencies or RATs. The UE also receives system information, consisting mainly of information required to use the transmission channels. To extend its battery lifetime, a UE in RRC_CONNECTED may be configured with a Discontinuous Reception (DRX) cycle. RRC is the protocol by which the E-UTRAN controls the UE behavior in RRC_CONNECTED.

FIG. 7 shows a state diagram with an overview of the relevant functions performed by the mobile terminal in IDLE and CONNECTED state.

Layer 1/Layer 2 (L1/L2) Control Signaling

In order to inform the scheduled users about their allocation status, transport format and other data-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length is a multiple of the subframes. The TTI length may be fixed in a service area for all users, may be different for different users, or may even by dynamic for each user. Generally, the L1/2 control signaling needs only be transmitted once per TTI.

The L1/L2 control signaling is transmitted on the Physical Downlink Control Channel (PDCCH). A PDCCH carries a message as a Downlink Control Information (DCI), which includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH.

With respect to scheduling grants, the information sent on the L1/L2 control signaling may be separated into the following two categories, Shared Control Information (SCI) carrying Cat 1 information and Downlink Control Information (DCI) carrying Cat 2/3 information.

Shared Control Information (SCI) Carrying Cat 1 Information

The shared control information part of the L1/L2 control signaling contains information related to the resource allocation (indication). The shared control information typically contains the following information:

A user identity indicating the user(s) that is/are allocated the resources.

RB allocation information for indicating the resources (Resource Blocks (RBs)) on which a user(s) is/are allocated. The number of allocated resource blocks can be dynamic.

The duration of assignment (optional), if an assignment over multiple subframes (or TTIs) is possible.

Depending on the setup of other channels and the setup of the Downlink Control Information (DCI)—see below—the shared control information may additionally contain information such as ACK/NACK for uplink transmission, uplink scheduling information, information on the DCI (resource, MCS, etc.).

Downlink Control Information (DCI) Carrying Cat 2/3 Information

The downlink control information part of the L1/L2 control signaling contains information related to the transmission format (Cat 2 information) of the data transmitted to a scheduled user indicated by the Cat 1 information. Moreover, in case of using (Hybrid) ARQ as a retransmission protocol, the Cat 2 information carries HARQ (Cat 3) information. The downlink control information needs only to be decoded by the user scheduled according to Cat 1. The downlink control information typically contains information on:

Cat 2 information: Modulation scheme, transport-block (payload) size or coding rate, MIMO (Multiple Input Multiple Output)-related information, etc. Either the transport-block (or payload size) or the code rate can be signaled. In any case these parameters can be calculated from each other by using the modulation scheme information and the resource information (number of allocated resource blocks)

Cat 3 information: HARQ related information, e.g., hybrid ARQ process number, redundancy version, retransmission sequence number Downlink control information occurs in several formats that differ in overall size and also in the information contained in its fields. The different DCI formats that are currently defined for LTE are as follows and described in detail in 3GPP TS 36.212, "Multiplexing and channel coding", section 5.3.3.1 (available at http://www.3gpp.org and incorporated herein by reference).

Format 0: DCI Format 0 is used for the transmission of resource grants for the PUSCH.

Format 1: DCI Format 1 is used for the transmission of resource assignments for single codeword POSCH transmissions (transmission modes 1, 2 and 7).

Format 1A: DCI Format 1A is used for compact signaling of resource assignments for single codeword POSCH transmissions, and for allocating a dedicated preamble signature to a mobile terminal for contention-free random access.

Format 1B: DCI Format 1B is used for compact signaling of resource assignments for POSCH transmissions using closed loop preceding with rank-1 transmission (transmission mode 6). The information transmitted is the same as in Format 1A, but with the addition of an indicator of the preceding vector applied for the POSCH transmission.

Format 1C: DCI Format 1C is used for very compact transmission of POSCH assignments. When format 1C is used, the POSCH transmission is constrained to using QPSK modulation. This is used, for example, for signaling paging messages and broadcast system information messages.

Format 10: OCI Format 10 is used for compact signaling of resource assignments for POSCH transmission using multi-user MIMO. The information transmitted is the same as in Format 1B, but instead of one of the bits of the preceding vector indicators, there is a single bit to indicate whether a power offset is applied to the data symbols. This feature is needed to show whether or not the transmission power is shared between two UEs. Future versions of LTE may extend this to the case of power sharing between larger numbers of UEs.

Format 2: OCI Format 2 is used for the transmission of resource assignments for POSCH for closed-loop MIMO operation.

Format 2A: OCI Format 2A is used for the transmission of resource assignments for POSCH for open-loop MIMO operation. The information transmitted is the same as for Format 2, except that if the eNodeB has two transmit antenna ports, there is no precoding information, and for four antenna ports two bits are used to indicate the transmission rank.

Format 3 and 3A: OCI formats 3 and 3A are used for the transmission of power control commands for PUCCH and PUSCH with 2-bit or 1-bit power adjustments respectively. These DCI formats contain individual power control commands for a group of UEs.

The following table gives an overview of the available DCI formats.

| DCI format | Purpose | Number of bits including CRC (for a system bandwidth of 50 RBs and four antennas at eNodeB) |
|---|---|---|
| 0 | PUSCH grants | 42 |
| 1 | POSCH assignments with a single codeword | 47 |
| 1A | POSCH assignments using a compact format | 42 |
| 1B | POSCH assignments for rank-1 transmission | 46 |
| 1C | POSCH assignments using a very compact format | 26 |
| 10 | POSCH assignments for multi-user MIMO | 46 |
| 2 | POSCH assignments for closed-loop MIMO operation | 62 |
| 2A | POSCH assignments for open-loop MIMO operation | 58 |
| 3 | Transmit Power Control (TPC) commands for multiple users for PUCCH and PUSCH with 2-bit power adjustments | 42 |
| 3A | Transmit Power Control (TPC) commands for multiple users for PUCCH and PUSCH with 1-bit power adjustments | 42 |

For further information regarding the DCI formats and the particular information that is transmitted in the DCI, please refer to the technical standard or to LTE—The UMTS Long Term Evolution—From Theory to Practice, Edited by Stefanie Sesia, lssam Toufik, Matthew Baker, Chapter 9.3, incorporated herein by reference.

Downlink & Uplink Data Transmission

Regarding downlink data transmission, L1/L2 control signaling is transmitted on a separate physical channel (PDCCH), along with the downlink packet data transmission. This L1/L2 control signaling typically contains information on:

The physical resource(s) on which the data is transmitted (e.g., subcarriers or subcarrier blocks in case of OFDM, codes in case of CDMA). This information allows the mobile terminal (receiver) to identify the resources on which the data is transmitted.

When user equipment is configured to have a Carrier Indication Field (CIF) in the L1/L2 control signaling, this information identifies the component carrier for which the specific control signaling information is intended. This enables assignments to be sent on one component carrier which are intended for another component carrier ("cross-carrier scheduling"). This other, cross-scheduled component carrier could be for example a PDCCH-less component carrier, i.e., the cross-scheduled component carrier does not carry any L1/L2 control signaling.

The Transport Format, which is used for the transmission. This can be the transport block size of the data (payload size, information bits size), the MCS (Modulation and Coding Scheme) level, the Spectral Efficiency, the code rate, etc. This information (usually together with the resource allocation (e.g., the number of resource blocks assigned to the user equipment)) allows the user equipment (receiver) to identify the information bit size, the modulation scheme and the code rate in order to start the demodulation, the de-rate-matching and the decoding process. The modulation scheme may be signaled explicitly.

Hybrid ARQ (HARQ) information:

HARQ process number: Allows the user equipment to identify the hybrid ARQ process on which the data is mapped.

Sequence number or new data indicator (NDI): Allows the user equipment to identify if the transmission is a new packet or a retransmitted packet. If soft combining is implemented in the HARQ protocol, the sequence number or new data indicator together with the HARQ process number enables soft-combining of the transmissions for a PDU prior to decoding.

Redundancy and/or constellation version: Tells the user equipment, which hybrid ARQ redundancy version is used (required for de-rate-matching) and/or which modulation constellation version is used (required for demodulation).

UE Identity (UE ID): Tells for which user equipment the L1/L2 control signaling is intended for. In typical implementations this information is used to mask the CRC of the L1/L2 control signaling in order to prevent other user equipments to read this information.

To enable an uplink packet data transmission, L1/L2 control signaling is transmitted on the downlink (PDCCH) to tell the user equipment about the transmission details. This L1/L2 control signaling typically contains information on:

The physical resource(s) on which the user equipment should transmit the data (e.g., subcarriers or subcarrier blocks in case of OFDM, codes in case of CDMA).

When user equipment is configured to have a Carrier Indication Field (CIF) in the L1/L2 control signaling, this information identifies the component carrier for which the specific control signaling information is intended. This enables assignments to be sent on one component carrier which are intended for another component carrier. This other, cross-scheduled component carrier may be for example a PDCCH-less component carrier, i.e., the cross-scheduled component carrier does not carry any L1/L2 control signaling.

L1/L2 control signaling for uplink grants is sent on the DL component carrier that is linked with the uplink component carrier or on one of the several DL component carriers, if several DL component carriers link to the same UL component carrier.

The Transport Format, the user equipment should use for the transmission. This can be the transport block size of the data (payload size, information bits size), the MCS (Modulation and Coding Scheme) level, the Spectral Efficiency, the code rate, etc. This information (usually together with the resource allocation (e.g., the number of resource blocks assigned to the user equipment)) allows the user equipment (transmitter) to pick the information bit size, the modulation scheme and the code rate in order to start the modulation, the rate-matching and the encoding process. In some cases the modulation scheme maybe signaled explicitly.

Hybrid ARQ information:

HARQ Process number: Tells the user equipment from which hybrid ARQ process it should pick the data.

Sequence number or new data indicator: Tells the user equipment to transmit a new packet or to retransmit a packet. If soft combining is implemented in the HARQ protocol, the sequence number or new data indicator together with the HARQ process number enables soft-combining of the transmissions for a protocol data unit (PDU) prior to decoding.

Redundancy and/or constellation version: Tells the user equipment, which hybrid ARQ redundancy version to use (required for rate-matching) and/or which modulation constellation version to use (required for modulation).

UE Identity (UE ID): Tells which user equipment should transmit data. In typical implementations this information is used to mask the CRC of the L1/L2 control signaling in order to prevent other user equipments to read this information.

There are several different possibilities how to exactly transmit the information pieces mentioned above in uplink and downlink data transmission. Moreover, in uplink and downlink, the L1/L2 control information may also contain additional information or may omit some of the information. For example:

HARQ process number may not be needed, i.e., is not signaled, in case of a synchronous HARQ protocol.

A redundancy and/or constellation version may not be needed, and thus not signaled, if Chase Combining is used (always the same redundancy and/or constellation version) or if the sequence of redundancy and/or constellation versions is pre-defined.

Power control information may be additionally included in the control signaling.

MIMO related control information, such as e.g., pre-coding, may be additionally included in the control signaling.

In case of multi-codeword MIMO transmission transport format and/or HARQ information for multiple codewords may be included.

For uplink resource assignments (on the Physical Uplink Shared Channel (PUSCH)) signaled on PDCCH in LTE, the L1/L2 control information does not contain a HARQ process number, since a synchronous HARQ protocol is employed for LTE uplink. The HARQ process to be used for an uplink transmission is given by the timing. Furthermore, it should be noted that the redundancy version (RV) information is jointly encoded with the transport format information, i.e., the RV info is embedded in the transport format (TF) field. The Transport Format (TF) respectively modulation and coding scheme (MCS) field has for example a size of 5 bits, which corresponds to 32 entries. 3 TF/MCS table entries are reserved for indicating redundancy versions (RVs) 1, 2 or 3. The remaining MCS table entries are used to signal the MCS level (TBS) implicitly indicating RVO. The size of the CRC field of the PDCCH is 16 bits.

For downlink assignments (PDSCH) signaled on PDCCH in LTE the Redundancy Version (RV) is signaled separately in a two-bit field. Furthermore the modulation order information is jointly encoded with the transport format information. Similar to the uplink case there is 5 bit MCS field signaled on PDCCH. 3 of the entries are reserved to signal an explicit modulation order, providing no Transport format (Transport block) info. For the remaining 29 entries modulation order and Transport block size info are signaled.

Physical Downlink Control Channel (PDCCH)

As already explained, a PDCCH carriers messages as DCIs. Each PDCCH is transmitted on an aggregation of one or more so called Control Channel Elements (CCEs), where each CCE corresponds to nine Resource Element Groups (REGs, i.e., sets of four physical resource elements). REGs constituting CCEs are not consecutive and CCEs are distributed in frequency over entire bandwidth. Note that CCEs are spread in frequency domain to achieve frequency diversity. Four PDCCH formats are supported as listed in the following table, which also shows the corresponding possible CCE aggregation levels.

| PDDCH format | Number of CCEs | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

CCEs are numbered and used consecutively, and to simplify the decoding process, a PDCCH with a format consisting of n CCEs may only start with a CCE with a number equal to a multiple of n.

The number of available CCEs in a cell varies; it may be semi static (System bandwidth, PHICH configuration) or dynamic (PCFICH).

The number of CCEs used for transmission of a particular PDCCH is determined by the eNodeB according to channel conditions. For example, if the PDCCH is intended for a mobile terminal with a good downlink channel, (e.g., close to the eNodeB) then one CCE is likely to be sufficient. However, for a mobile terminal with a poor channel (e.g., near the cell border) then eight CCEs may be required in order to achieve sufficient robustness. In addition, the power level of a PDCCH may be adjusted to match the channel conditions.

In detecting a PDCCH, the mobile terminal shall monitor a set of PDCCH candidates for control information in every non-DRX subframe, where monitoring refers to the process of attempting to decode each of PDCCHs in the set according to all DCI formats, as will be explained in more detail later.

In order that the mobile terminal can identify whether it has received a PDDCH transmission correctly, error detection is provided by means of a 16-bit CRC appended to each PDCCH. Furthermore, it is necessary that the UE can identify which PDCCHs are intended for it. This could in theory be achieved by adding an identifier to the PDCCH payload; however, it turns out to be more efficient to scramble the CRC with the UE identity (e.g., C-RNTI, Cell Radio Network Temporary Identifier), which saves the additional payload but at the cost of a small increase in the probability of falsely detecting a POCCH intended for another UE.

The Physical Control Format Indicator Channel (PCFICH) carries a Control Format Indicator (CFI) which indicates the number of OFDM symbols used for transmission of control channel information in each subframe. The eNodeB is capable of transmitting multiple PDCCHs in a subframe. The transmissions are organized such that a UE can locate the PDCCHs intended for it, while at the same time making efficient use of the resources allocated for PDCCH transmissions.

A simple approach, at least for the eNodeB, would be to allow the eNodeB to place any PDCCH anywhere in the PDCCH resources (or CCEs) indicated by the PCFICH. In this case, the UE would need to check all possible PDCCH locations, PDCCH formats and DCI formats, and act on those messages with correct CRCs (taking into account the CRC is scrambled with a UE identity). Carrying out such a blind decoding of all the possible combinations would require the UE to make many PDDCH decoding attempts in every subframe. For small system bandwidths the computational load might be reasonable, but for large system bandwidths with a large number of possible PDCCH locations, it would become a significant burden, leading to excessive power consumption in the UE receiver.

The alternative approach adopted for LTE is to define for each UE a limited set of CCE locations where a PDCCH may be placed. Such a constraint may lead to some limitations as to which UEs can be sent PDCCHs within the same subframe, which would thus restrict the UEs to which the eNodeB could grant resources. Therefore, it is important for good system performance that the set of possible PDCCHs locations available for each UE is not too small. The set of CCE locations in which the UE may find its PDCCHs can be considered as a search space. In LTE the search space is of different size for each PDCCH format. Moreover, separate dedicated and common search spaces are defined, where a dedicated search space is configured for each UE individually, while all UEs are informed of the extent of the common search space. Note that the dedicated and common search spaces may overlap for a given UE.

With small search spaces it is quite possible in a given subframe that the eNodeB cannot find CCE resources to send PDCCHs to all the UEs that it would like to, because, having assigned some CCE locations, the remaining CCE locations are not in the search space of a particular UE.

In order to keep under control the computational load arising from the total number of blind decoding attempts, the UE is not required to search for all the defined DCI formats simultaneously.

In the common search space the UE will search for DCI Formats 1A and 1C. In addition, the UE may be configured to search for Format 3 or 3A, which have the same size as DCI formats 0 and 1A, and may be distinguished by having the CRC scrambled by different (common) identity (e.g., PC-PUCCH-RNTI), rather than a UE-specific one (e.g., C-RNTI). In particular, PC-PUCCH-RNTI (Transmit Power Control-Physical Uplink Control Channel-RNTI) and TPC-PUSCH-RNTI (Transmit Power Control-Physical Uplink Shared Channel-RNTI) are used in said respect.

DCI formats 0, 1A, 1C, 3 and 3A have two different payload sizes. The common search space is monitored by all UEs and may correspond to CCEs 0-15, rendering 4 decoding candidates with PDCCH format 2: 0-3, 4-7, 8-11, 12-15, or 2 decoding candidates with PDCCH format 3: 0-7, 8-15. In this case, there would be six blind decode attempts per payload size, and two different PDCCH payload sizes, thus having a total number of blind decodes per UE of 12.

The power-control message of DCI Format 3, 3A is directed to a group of terminals using an RNTI specific for that group. Each terminal can be allocated two power-control RNTIs, one for PUCCH power control and the other for PUSCH power control.

Typically, in the dedicated search space, the UE will always search for DCI formats 0 and 1A, which are both the same size and are distinguished by a flag in the message. In addition, a UE may be required to receive further DCI formats (e.g., 1, 1B or 2) depending on the PDSCH transmission mode configured by the eNodeB.

The starting location of the UE specific search space is usually determined by a hashing function based, e.g., on the slot number within the radio frame, the RNTI value and other parameters. The UE specific search space allows aggregation levels of 1, 2, 4 and 8 CCEs.

Further information is provided in LTE—The UMTS Long Term Evolution—From Theory to Practice, Edited by Stefanie Sesia, Issam Toufik, Matthew Baker, Chapter 9.3, incorporated herein by reference.

DRX (Discontinuous Reception)

DRX functionality can be configured for RRC_IDLE, in which case the UE uses either the specific or default DRX value (defaultPagingCycle); the default is broadcasted in the System Information, and can have values of 32, 64, 128 and 256 radio frames. If both specific and default values are available, the shorter value of the two is chosen by the UE. The UE needs to wake up for one paging occasion per DRX cycle, the paging occasion being one subframe.

DRX functionality can be also configured for an "RRC_CONNECTED" UE, so that it does not always need to monitor the downlink channels. In order to provide reasonable battery consumption of user equipment, 3GPP LTE (Release 8/9) as well as 3GPP LTE-A (Release 10) provides a concept of discontinuous reception (DRX). Technical Standard TS 36.321 Chapter 5.7 explains the DRX and is incorporated by reference herein.

The following parameters are available to define the DRX UE behavior; i.e., the On-Duration periods at which the mobile node is active, and the periods where the mobile node is in a DRX mode.

- On duration: duration in downlink subframes that the user equipment, after waking up from DRX, receives and monitors the PDCCH. If the user equipment successfully decodes a PDCCH, the user equipment stays awake and starts the inactivity timer; [1-200 subframes; 16 steps: 1-6, 10-60, 80, 100, 200].
- DRX inactivity timer: duration in downlink subframes that the user equipment waits to successfully decode a PDCCH, from the last successful decoding of a PDCCH; when the UE fails to decode a PDCCH during this period, it re-enters DRX. The user equipment shall restart the inactivity timer following a single successful decoding of a PDCCH for a first transmission only (i.e., not for retransmissions). [1-2560 subframes; 22 steps, 10 spares: 1-6, 8, 10-60, 80, 100-300, 500, 750, 1280, 1920, 2560]
- DRX Retransmission timer: specifies the number of consecutive PDCCH subframes where a downlink retransmission is expected by the UE after the first available retransmission time. [1-33 subframes, 8 steps: 1, 2, 4, 6, 8, 16, 24, 33]
- DRX short cycle: specifies the periodic repetition of the on duration followed by a possible period of inactivity for the short DRX cycle. This parameter is optional. [2-640 subframes; 16 steps: 2, 5, 8, 10, 16, 20, 32, 40, 64, 80, 128, 160, 256, 320, 512, 640]
- DRX short cycle timer: specifies the number of consecutive subframes the UE follows the short DRX cycle after the DRX Inactivity Timer has expired. This parameter is optional. [1-16 subframes]
- Long DRX Cycle Start offset: specifies the periodic repetition of the on duration followed by a possible period of inactivity for the DRX long cycle as well as an offset in subframes when on-duration starts (determined by formula defined in TS 36.321 section 5.7); [cycle length 10-2560 subframes; 16 steps: 10, 20, 30, 32, 40, 64, 80, 128, 160, 256, 320, 512, 640, 1024, 1280, 2048, 2560; offset is an integer between [0–subframe length of chosen cycle]]

The total duration that the UE is awake is called "Active time". The Active Time includes the on-duration of the DRX cycle, the time UE is performing continuous reception while the inactivity timer has not expired and the time UE is performing continuous reception while waiting for a downlink retransmission after one HRQ RTT. Based on the above, the minimum active time is of length equal to on-duration, and the maximum is undefined (infinite).

The operation of DRX gives the mobile terminal the opportunity to deactivate the radio circuits repeatedly (according to the currently active DRX cycle) in order to save power. Whether the UE indeed remains in DRX (i.e., is not active) during the DRX period may be decided by the UE; for example, the UE usually performs inter-frequency measurements which cannot be conducted during the On-Duration, and thus need to be performed some other time, during the DRX opportunity of time.

The parameterization of the DRX cycle involves a trade-off between battery saving and latency. For example, in case of a web browsing service, it is usually a waste of resources for a UE to continuously receive downlink channels while the user is reading a downloaded web page. On the one hand, a long DRX period is beneficial for lengthening the UE's battery life. On the other hand, a short DRX period is better for faster response when data transfer is resumed—for example when a user requests another web page.

To meet these conflicting requirements, two DRX cycles—a short cycle and a long cycle—can be configured for each UE; the short DRX cycle is optional, i.e., only the long DRX cycle is used. The transition between the short DRX cycle, the long DRX cycle and continuous reception is controlled either by a timer or by explicit commands from the eNodeB. In some sense, the short DRX cycle can be considered as a confirmation period in case a late packet arrives, before the UE enters the long DRX cycle. If data arrives at the eNodeB while the UE is in the short DRX cycle, the data is scheduled for transmission at the next on-duration time, and the UE then resumes continuous reception. On the other hand, if no data arrives at the eNodeB during the short DRX cycle, the UE enters the long DRX cycle, assuming that the packet activity is finished for the time being.

During the Active Time the UE monitors PDCCH, reports SRS (Sounding Reference Signal) as configured and reports CQI (Channel Quality Information)/PMI (Precoding Matrix Indicator)/RI (Rank Indicator)/PTI (Precoder Type Indication) on PUCCH. When UE is not in Active time, type-0-triggered SRS and CQI/PMI/RI/PTI on PUCCH may not be reported. If CQI masking is set up for the UE, the reporting of CQI/PMI/RI/PTI on PUCCH is limited to On Duration.

Available DRX values are controlled by the network and start from non-DRX up to x seconds. Value x may be as long as the paging DRX used in RRC_IDLE. Measurement requirements and reporting criteria can differ according to the length of the DRX interval, i.e., long DRX intervals may have more relaxed requirements (for more details see further below).

FIG. 8 discloses an example of DRX. The UE checks for scheduling messages (indicated by its C-RNTI, cell radio network temporary identity, on the PDCCH) during the "on duration" period, which is the same for the long DRX cycle and the short DRX cycle. When a scheduling message is received during an "on duration", the UE starts an "inactivity timer" and monitors the PDCCH in every subframe while the Inactivity Timer is running. During this period, the UE can be regarded as being in a continuous reception mode. Whenever a scheduling message is received while the Inactivity Timer is running, the UE restarts the Inactivity Timer, and when it expires the UE moves into a short DRX cycle and starts a "short DRX cycle timer". The short DRX cycle may also be initiated by means of a MAC Control Element. When the short DRX cycle timer expires, the UE moves into a long DRX cycle.

In addition to this DRX behavior, a 'HARQ Round Trip Time (RTT) timer' is defined with the aim of allowing the UE to sleep during the HARQ RTT. When decoding of a downlink transport block for one HARQ process fails, the UE can assume that the next retransmission of the transport block will occur after at least 'HARQ RTT' subframes. While the HARQ RTT timer is running, the UE does not need to monitor the PDCCH. At the expiry of the HARQ RTT timer, the UE resumes reception of the PDCCH as normal.

There is only one DRX cycle per user equipment. All aggregated component carriers follow this DRX pattern.

FIG. 9 illustrates the DRX operation of a UE having a long DRX cycle with a high number of subframes, whereas FIG. 10 illustrates the DRX operation of a UE having a long DRX cycle with a low number of subframes. As can be seen from these figures, the "short" long DRX cycle of FIG. 10 is advantageous in that the eNodeB does not have to wait too long for an opportunity to schedule the UE, compared to the long DRX cycle of FIG. 9.

Fast Dormancy

Smart phones have an increasing number of applications that only send a small amount of data, but the transmission frequency of the packets is relatively high. Such always-on applications include for example, email, instant messaging and widgets. It is important to keep UE power consumption low while having frequent transmissions. The UE could be moved to idle state for low power consumption. However, the idle state should be avoided because the next packet will then cause packet connection set-up, leading to increased latencies and signaling traffic in the network.

In order to keep UE power consumption low, the proprietary (i.e., functionality not defined by 3GPP standards) fast dormancy was introduced. When using fast dormancy, the mobile application informs the radio layers when the data transmission is over, and the UE can then send the Signaling Connection Release Indication (SCRI) to the RNC simulating a failure in the signaling connection. Consequently, the UE releases the RRC connection and moves to idle state. This approach keeps the UE power consumption low, but it causes frequent set-ups of packet connections unnecessarily increasing the signaling load. In addition, the network counters indicate a large number of signaling connection failures as this battery-saving method cannot be distinguished from a genuine signaling connection failure in the network.

3GPP Release 8 specified Fast Dormancy functionality, clarifying the UE behavior and providing the network with information of what the UE actually wants to do, but leaving the network in charge of the UE RRC state. Put differently, the UE is not allowed to release the RRC connection and move to idle on its own without network control. For further information on Fast Dormancy: WCDMA For UMTS—HSPA Evolution and LTE—Fifth Edition; Edited by Harri Holma and Antti Toskala, Chapter 15.6.

Measurements

Measurements performed by an UE are part of the Radio Resource Management and configured by the eNB. They mainly (but not exclusively) serve the purpose of handling mobility with other LTE cells or cells belonging to other Radio Access Technologies (RATs).

The Radio Resource Management procedures (specified in TS 36.133) distinguish between measurements performed in RRC_IDLE state and RRC_CONNECTED state. In the following intra-frequency measurements (i.e., the measurements on the serving cell(s) and cells located in the same frequency band), inter-frequency measurements (i.e., the measurements for cells on a frequency band different from that of the current serving cell(s)) and inter-RAT (i.e., measurements for those cells operating with other radio access technologies than UTRAN) are described in more detail with a focus on the RRC_CONNECTED state and the measurement requirements that UE has to follow when it is in discontinuous reception (DRX).

Intra-Frequency Measurements

LTE intra frequency monitoring aims at performing measurements both on the serving cell and on neighboring cells which use the same carrier frequency as the serving cell.

When DRX activity is enabled, the UE must be able to take advantage of the opportunities to save power between subsequent DRX "on periods." Intra-frequency monitoring performance relaxations will only be defined for those cases where the periodicity of the "on period" is larger than 40 ms (Chapter 13.6.1.1 of LTE—The UMTS Long Term Evolution, Edited by: Stefania Sesia, Issam Toufik, Matthew Baker, 2009).

For measurements in the RRC_CONNECTED state when DRX is in use, the amount of intra-frequency measurements (as well as the inter-frequency and inter-RAT, see below) that are to be performed, depend on the DRX cycle length of the long DRX cycle. The below table discloses the times T_Identify and T_Measure in seconds depending on the amount of subframes of the DRX cycle.

In order to be able to perform RSRP (Reference Signal Receive Power) and RSRQ (Reference Signal Reference Quality) measurements, the UE must first synchronize to and determine the cell ID of neighbor cells; T_Identify is the time the UE is required to perform the identification of neighboring cells it is not aware of yet; e.g., when the DRX cycle is between 40 and 80 subframes long, the UE needs to have finished the identification of neighboring cells within 40 DRX cycles (i.e., 1.6 to 3.2 seconds). T_Measure defines how long the UE has time to perform the intra-frequency measurements on the serving and neighboring cells; e.g., when the DRX cycle is 128 subframes, the UE needs to have finished the intra-frequency measurements within 5 DRX cycles (i.e., 0.64 seconds).

The exact timing when the cell identification and the measurements are performed, depends on the UE implementation. For example, the intra-frequency measurements which do not necessitate recalibrating the radio to another frequency (in contrast to inter-frequency measurements), the cell identification and measurements could be performed during the On-Duration where the UE is already active.

It is assumed that five measurement samples are necessary to obtain an accurate measurement results, and one subframe for every measurement sample is sufficient. See TS 36.133 Table 8.1.2.2.1.2-2 where T_Measure is indicated to be 0.2 seconds for a DRX cycle of less than 40 subframes, and 5 cycles for DRX cycles of >=40 subframes. This concludes that with a DRX cycle length of, e.g., 40 subframes, the measurement will be obtained within 200 ms. The cell identification may be operated in parallel to the intra-frequency measurements.

However, cell identification might require a longer time span within each DRX cycle, e.g., 5 ms.

|  | DRX cycle (subframes) | | | |
| --- | --- | --- | --- | --- |
|  | <40 | 40-80 | 128 | >128 |
| T Identify (s) | 0.8 | 1.6-3.2 (40 cycles) | 3.2 (25 cycles) | 3.2-51.2 (20 cycles) |
| T Measure (s) | 0.2 | 0.2-0.4 (5 cycles) | 0.64 (5 cycles) | 0.8-12.8 (5 cycles) |

Inter-Frequency Measurements

LTE inter-frequency monitoring is very similar to intra-frequency monitoring. When the UE is not in DRX), the inter-frequency measurement is implemented using monitoring gaps. For a 6 ms gap pattern only 5 ms are available for inter-frequency monitoring, once the switching time has been removed; i.e., the time for the radio frequency tuning is 1 ms. UE may have 8 times (80 ms gap period) or 16 times (40 ms gap period) for measurement in 640 ms. The 5 ms stems from primary and secondary synch-channels existing every 5 ms for cell identification.

If the monitoring gaps repeat every 40 ms only 5/40=12.5% is available for inter-frequency monitoring. For this reason LTE inter-frequency maximum cell identification time and measurement periods need to be longer than for the intra-frequency case.

Within one monitoring gap the presence of the PSS (Primary Synchronization Symbol) and SSS (Secondary Synchronization Symbol) symbols is guaranteed since they repeat every 5 ms, and there is also sufficient reference signals (RS) to perform power accumulation and obtain a measurement sample for RSRP calculation. There is also sufficient signal to perform an LTE carrier RSSI (Received Signal Strength Indicator) measurement to derive RSRQ.

Similar to the intra-frequency case, if the UE is in DRX mode, some performance relaxation is required to ensure that the UE can take advantage of the DRX periods to save power. How long the UE takes only for measurement but not for identification is UE implementation dependent. The UE will use more than 5 ms for both measurement and identification. This time period for cell identification and measurement is outside the Active Time, in order to be able to retune the radio frequency part of the receiver to the other frequency.

The below table is exemplary for a gap pattern ID 0 and Nfreq=1, and discloses the time requirements for the identification of neighboring cells and the inter-frequency measurements depending on the amount of subframes of the currently active DRX cycle.

|  | DRX cycle (subframes) | | | |
| --- | --- | --- | --- | --- |
|  | <=160 | 256 | 320 | >320 |
| T Identify (s) | 3.84 | 5.12 (20 cycles) | 6.4 (20 cycles) | 10.24-51.2 (20 cycles) |
| T Measure (s) | 0.48 | 1.28 (5 cycles) | 1.6 (5 cycles) | 1.6-12.8 (5 cycles) |

Inter RAT (Radio Access Technology)

Inter-RAT measurements refer to downlink physical channels belonging to another radio access technology than UTRAN, e.g., GSM. The below table is an example for gap pattern ID 0, Nfreq=1 and UTRA_FDD.

|  | DRX cycle (subframes) | | | | | |
| --- | --- | --- | --- | --- | --- | --- |
|  | <=40 | 64 | 80 | 128 | 160 | >160 |
| Identify (s) | 2.4 | 2.56 (40 cycles) | 3.2 (40 cycles) | 3.2 (25 cycles) | 3.2 (20 cycles) | 10.24-51.2 (20 cycles) |
| Measure (s) | 0.48 | 0.48 | 0.48 | 0.64 | 0.8 (5 cycles) | 1.28-12.8 (5 cycles) |

Disadvantages of the Prior Art

As already explained above, the short and long DRX cycles allow a trade-off between a high battery saving and a fast response to data scheduling.

This waste of battery power is further exacerbated by the measurement and reporting requirements imposed on the UE and which depend on the long DRX cycle. As explained above, intra-frequency, inter-frequency and inter-RAT measurements are to be performed by the mobile terminal within time intervals depending on the actual DRX cycle length. Furthermore, in the active time the UE has to report SRS and CQI/PMI/RI/PTI on the PUCCH.

The intra-frequency measurements can be performed during the On-duration of the DRX operation, provided the On-duration is sufficiently long to perform said measurements, i.e., at least 5 subframes. On the other hand, inter-frequency measurements need to be performed during one of the DRX opportunities where the UE is allowed to be inactive, since the radio tuner needs to be calibrated to another frequency, which may typically take 6 subframes.

Since the measurements requirements depend on the long DRX cycle subframe length, a short DRX cycle results in that the UE has to perform the measurements more times. Taking intra-frequency measurements as an example, for a long DRX cycle length of 40 subframes, the UE has to repeatedly identify neighboring cells within 1.6 s, and has to perform intra-frequency measurements within 0.2 s. The time requirements are relaxed for a long DRX cycle length of, e.g., 2560 subframes, where the neighboring cell identification has to be performed within 51.2 sand the intra-frequency measurements within 12.8 s (see table above).

Thus, in case the long DRX cycle is shortened to allow a reduced response time for data transmission/reception, the impact on the battery due to the On-duration and also the measurement requirements is high.

Therefore, it is important to allow a fast response time of the UE with only a minimum impact on the battery consumption of the UE.

BRIEF SUMMARY OF THE INVENTION

The present disclosure strives to avoid the various disadvantages mentioned above.

One object of the disclosure is to propose a mechanism for an improved discontinuous reception operation at the mobile terminal.

The object is solved by the subject matter of the independent claims.

Advantageous embodiments are subject to the dependent claims.

According to a first aspect, the disclosure suggests an improvement to the DRX operation of the prior art by introducing an additional DRX cycle, a so called DRX wake-up cycle, which runs in parallel to the short and/or long DRX cycle already standardized and known from the prior art. The operation of the mobile terminal with regard to the short and long DRX cycle needs not be changed to implement the present disclosure. The mobile terminal performs the DRX wake-up cycle operation as follows.

The wake-up cycle defines time intervals after which the mobile terminal starts monitoring the downlink control channel for a particular time duration, in the following called wake-up duration. The time intervals of the wake-up cycle between the wake-up durations are preferably shorter than the one of the DRX long cycle, and may have the same or a shorter length than the ones of the DRX short cycle. The wake-up duration may be as long as the on-duration of the DRX short/long cycle, or may be preferably much shorter, such as only one or a few subframes.

Furthermore, in one embodiment of the disclosure the mobile terminal monitors the downlink control channel in a same way as during the on-duration of the short/long DRX cycle; i.e., the mobile terminal monitors for the same downlink control channel messages destined to itself during the wake-up duration as during the on-duration. Preferably however, the mobile terminal does not monitor the downlink control channel for all possible messages, but only for particular messages, e.g., such as for downlink and uplink scheduling messages.

The wake-up duration according to the DRX wake-up cycle further differentiates from the on-duration according to the DRX short/long cycle, in that the mobile terminal operates only to monitor the downlink control channel during the wake-up duration, whereas the mobile terminal has to perform further functions during the on-duration besides the monitoring of the downlink control channel, such as measurements and reporting as explained in the background section.

Furthermore, the mobile terminal operation according to the DRX wake-up cycle may start at the same time as the one according to the DRX short or long cycle. In more detail, in one embodiment of the disclosure the inactivity timer of the mobile terminal expires and the mobile terminal may thus enter the DRX mode, starting, e.g., the DRX short cycle as explained in the background section. At the same time however, the mobile terminal may also start the operation according to the DRX wake-up cycle. Alternatively, the mobile may start the operation according to the DRX wake-up cycle in parallel with the DRX long cycle, i.e., after expiry of the DRX short cycle timer; in this case, the DRX wake-up cycle runs in parallel to only the DRX long cycle, but not in parallel to the DRX short cycle. As a further alternative, the mobile terminal may start the operation according to the DRX wake-up cycle when the mobile terminal starts the DRX short cycle but stops the DRX wake-up cycle when the mobile terminal enters the DRX long cycle.

A further important aspect to the disclosure is that the measurement and reporting requirements (e.g., intra-frequency, inter-frequency, inter-RAT, CQI reporting) are still depending on the length of the intervals of the DRX long cycle; the measurement and reporting requirements are not influenced by the DRX wake-up cycle introduced by the embodiments of the disclosure. Correspondingly, while the mobile terminal has the opportunity of waking-up more often, it does not need to perform measurements or reporting more often.

As with the mobile terminal operation of the DRX short/long cycle, the mobile terminal becomes active when during the wake-up duration of the DRX wake-up cycle it detects a downlink control channel message destined to itself.

For instance, the base station, controlling the cell to which the mobile terminal is attached, sends a scheduling message to the mobile terminal in case the mobile terminal is to transmit and/or receive data in the uplink and/or the downlink. The base station, knowing the DRX wake-up cycle and the corresponding wake-up opportunities given by the wake-up duration, transmits the scheduling message in the particular subframe or one of the particular subframes of the wake-up duration. The mobile terminal for the wake-up duration checks the downlink control channel for such messages, and thus detects the scheduling message transmitted by the base station. The mobile terminal may thus decode the scheduling message and becomes active so as to perform the necessary operation for receiving respectively transmitting the data according to the scheduling message.

The present disclosure thus combines the advantages of the DRX short and long cycle while avoiding the disadvantages thereof. In more detail, since the DRX wake-up cycle preferably implements short intervals between the wake-up opportunities of the wake-up duration, the response time of the mobile terminal may be greatly reduced, thus allowing the base station to schedule the mobile terminal sooner. At the same time, since the wake-up duration preferably spans only one or a few subframes, the impact on the battery saving is minimal and the battery consumption is only slightly increased, especially, compared to having a very short long DRX cycle or short DRX cycle. This is even more so, since the measurement and reporting requirements imposed on the mobile terminal still only depend on the long DRX cycle, where intervals are usually much longer than those of the DRX wake-up cycle.

The present disclosure provides a method for discontinuous reception for a mobile terminal being in communication with a base station in a mobile communication system. The mobile terminal is configured by the base station with a first discontinuous reception cycle and an additional discontinuous reception cycle. After time intervals according to the first discontinuous reception cycle, the mobile terminal becomes active for an on-duration of time. In parallel to becoming active according to the first discontinuous reception cycle and after time intervals according to the additional discontinuous reception cycle, the mobile terminal monitors the downlink control channel for messages destined to the mobile terminal for a particular duration of time.

According to an advantageous embodiment of the disclosure which can be used in addition or alternatively to the above, the mobile terminal starts the discontinuous reception according to the first discontinuous reception cycle and the additional discontinuous reception cycle at the same time or with a predetermined time offset between each other.

According to an advantageous embodiment of the disclosure which can be used in addition or alternatively to the above, the mobile terminal during the particular duration of time is not active and preferably only performs the monitoring of the downlink control channel for messages destined to the mobile terminal.

According to an advantageous embodiment of the disclosure which can be used in addition or alternatively to the above, the particular duration of time is at least one sub-frame. In a preferred embodiment, the time intervals according to the first discontinuous reception cycle are longer than the time intervals according to the additional discontinuous reception cycle.

According to an advantageous embodiment of the disclosure which can be used in addition or alternatively to the above, the mobile terminal in discontinuous reception mode is to perform measurements. Measurement requirements for the measurements depend on the first discontinuous reception cycle. In a preferred embodiment, the measurement requirements comprise measurement requirements for intra-frequency measurements according to which the mobile terminal is to identify neighboring cells within a first time period and is to perform the intra-frequency measurements within a second time period. In another preferred embodiment, the measurement requirements comprise measurement requirements for inter-frequency measurements according to which the mobile terminal is to identify neighboring cells within a third time period and is to perform the inter-frequency measurements within a fourth time period. In still another preferred embodiment, the measurement requirements comprise measurement requirements for inter radio access technology measurements according to which the mobile terminal is to identify neighboring cells within a fifth time period and is to perform the inter-radio access technology measurements within a sixth time period.

According to an advantageous embodiment of the disclosure which can be used in addition or alternatively to the above, the mobile terminal during the on-duration of time transmits to the base station sounding reference signals and/or transmits results of measurements previously performed by the mobile terminal. In a preferred embodiment, the measurement results to be transmitted to the base station comprise at least one of the following: channel quality information, precoding matrix indicator, rank indicator, precoder type indication.

According to an advantageous embodiment of the disclosure which can be used in addition or alternatively to the above, the first discontinuous reception cycle is a long discontinuous reception cycle, wherein the mobile terminal is further configured with a short discontinuous reception cycle. After time intervals according to the short discontinuous reception cycle, the mobile terminal becomes active for the on-duration of time. The time intervals according to the short discontinuous reception cycle are different from the time intervals according to the long discontinuous reception cycle. The mobile terminal operates according to the short discontinuous reception cycle until a short discontinuous reception cycle timer expires, and upon expiry of the short discontinuous reception cycle timer, the mobile terminal operates in parallel according to the long discontinuous reception cycle and according to the additional discontinuous reception cycle.

According to an advantageous embodiment of the disclosure which can be used in addition or alternatively to the above, the messages for which the mobile terminal monitors the downlink control channel for the particular duration of time refer only to scheduling. In addition or alternatively, the mobile terminal monitors the downlink control channel for the particular duration of time only for messages according to at least but not all of predetermined downlink control information formats. In addition or alternatively the mobile terminal monitors the downlink control channel for the particular duration of time only for messages that request the mobile terminal to transmit a channel state information report.

According to an advantageous embodiment of the disclosure which can be used in addition or alternatively to the above, the mobile terminal monitors the downlink control channel for the particular duration of time only according to at least one but not all of predetermined formats of the downlink control channel. In addition or alternatively, the mobile terminal monitors the downlink control channel for the particular duration of time only in a predetermined limited search space.

According to an advantageous embodiment of the disclosure which can be used in addition or alternatively to the above, the mobile terminal is configured with one primary cell and at least one activated secondary cell.

Herein the mobile terminal monitors during the particular duration of time only the downlink control channel transmitted on the primary cell. In a preferred embodiment the secondary cell is on a different frequency band than the primary cell.

According to an advantageous embodiment of the disclosure which can be used in addition or alternatively to the above, cross scheduling is used for the mobile terminal, performing scheduling on the at least one secondary cell via scheduling messages transmitted over the primary cell. In this case, the mobile terminal may ignore scheduling messages for the secondary cell when monitoring the downlink control channel of the primary cell.

According to an advantageous embodiment of the disclosure which can be used in addition or alternatively to the above, measurement requirements for a secondary cell do not depend on the first discontinuous reception cycle but depend on a measurement requirement cycle for a deactivated secondary cell.

According to an advantageous embodiment of the disclosure which can be used in addition or alternatively to the above, the mobile terminal monitors the downlink control channel for the particular duration of time only a predetermined number of times after the on-duration of the first discontinuous reception cycle. This is achieved in a preferred embodiment by using an enable timer that is started upon expiry of the active time of the mobile terminal for the on-duration of time. The mobile terminal operates according to the additional discontinuous cycle only when the enable timer is running.

In addition or alternatively, the mobile terminal monitors the downlink control channel for the particular duration of time only a predetermined number of times before the on-duration of the first discontinuous reception cycle. This is achieved in a preferred embodiment by using a prohibition timer that is started upon expiry of the active time of the mobile terminal for the on-duration of time.

The mobile terminal operates according to the additional discontinuous cycle only when the prohibition timer is not running.

According to an advantageous embodiment of the disclosure which can be used in addition or alternatively to the above, the mobile terminal monitors the downlink control channel only within a limited band of frequencies, preferably 1.4 MHz around the center frequency of the downlink control channel.

The present disclosure further provides a mobile terminal for performing discontinuous reception and being in communication with a base station in a mobile communication system. The mobile terminal is configured by the base station with a first discontinuous reception cycle and an additional discontinuous reception cycle. After time intervals according to the first discontinuous reception cycle, the mobile terminal becomes active for an on-duration of time. In parallel to becoming active according to the first discontinuous reception cycle and after time intervals according to the additional discontinuous reception cycle, a receiver of the mobile terminal monitors the downlink control channel for messages destined to the mobile terminal for a particular duration of time.

According to an advantageous embodiment of the disclosure which can be used in addition or alternatively to the above, a processor of the mobile terminal and the receiver start the discontinuous reception according to the first discontinuous reception cycle and the additional discontinuous reception cycle at the same time or with a predetermined time offset between each other.

According to an advantageous embodiment of the disclosure which can be used in addition or alternatively to the above, the mobile terminal is not active during the particular duration of time. In a preferred embodiment, the processor and receiver only perform the monitoring of the downlink control channel for messages destined to the mobile terminal.

According to an advantageous embodiment of the disclosure which can be used in addition or alternatively to the above, the particular duration of time which the receiver monitors the downlink control channel is at least one subframe. In a preferred embodiment, the time intervals according to the first discontinuous reception cycle are longer than the time intervals according to the additional discontinuous reception cycle.

According to an advantageous embodiment of the disclosure which can be used in addition or alternatively to the above, the receiver of the mobile terminal in discontinuous reception mode is to perform measurements. A processor of the mobile terminal determines measurement requirements for the measurements based on the first discontinuous reception cycle. In a preferred embodiment the processor determines measurement requirements for intra-frequency measurements; this includes determining a first time period, within which the processor and the receiver identify neighboring cells, and a second time period within which the processor and the receiver perform the intra-frequency measurements.

In a preferred embodiment, the processor determines measurement requirements for inter-frequency measurements. This includes determining a third time period, within which the processor and the receiver identify neighboring cells, and a fourth time period within which the processor and the receiver perform the inter-frequency measurements.

In a preferred embodiment, the processor determines measurement requirements for inter radio access technology measurements. This includes determining a fifth time period, within which the processor and the receiver identify neighboring cells, and a sixth time period within which the processor and the receiver perform the inter radio access technology measurements.

According to an advantageous embodiment of the disclosure which can be used in addition or alternatively to the above, the mobile terminal comprises a transmitter for transmitting to the base station sounding reference signals and/or results of measurements a processor of the mobile terminal and the receiver performed previously.

According to an advantageous embodiment of the disclosure which can be used in addition or alternatively to the above, the receiver monitors the downlink control channel for the particular duration of time only for messages referring to scheduling. In addition or alternatively, the receiver monitors the downlink control channel for the particular duration of time only for messages according to at least but not all of predetermined downlink control information formats. In addition or alternatively, the receiver monitors the downlink control channel for the particular duration of time only for messages that request the mobile terminal to transmit a channel state information report.

According to an advantageous embodiment of the disclosure which can be used in addition or alternatively to the above, the receiver monitors the downlink control channel for the particular duration of time only according to at least but not all of predetermined formats of the downlink control channel. In addition or alternatively, the receiver monitors the downlink control channel for particular duration of time only in a predetermined limited search space.

According to an advantageous embodiment of the disclosure which can be used in addition or alternatively to the above, the mobile terminal is configured with one primary cell and at least one activated secondary cell. The receiver monitors during the particular duration of time only the downlink control channel transmitted on the primary cell.

According to an advantageous embodiment of the disclosure which can be used in addition or alternatively to the above, a processor of the mobile terminal starts an enable timer upon expiry of the active time of the mobile terminal for the on-duration of time. The processor determines whether the enable timer is running, and only in case it is determined that the enable timer is running, the receiver monitors the downlink control channel for the particular duration of time.

In addition or alternatively, a processor of the mobile terminal starts a prohibition timer upon expiry of the active time of the mobile terminal for the on-duration of time. The processor determines whether the prohibition timer is running, and only in case it is determined that the prohibition timer is not running, the receiver monitors the downlink control channel for the particular duration of time.

BRIEF DESCRIPTION OF THE DRAWINGS

In the following the disclosure is described in more detail in reference to the attached figures and drawings. Similar or corresponding details in the figures are marked with the same reference numerals.

DETAILED DESCRIPTION OF THE INVENTION

The following paragraphs will describe various embodiments of the disclosure. For exemplary purposes only, most of the embodiments are outlined in relation to a radio access scheme according to 3GPP LTE (Release 8/9) and LTE-A (Release 10/11) mobile communication systems, partly discussed in the Technical Background section above. It should be noted that the disclosure may be advantageously used for example in a mobile communication system such as 3GPP LTE-A (Release 10/11) communication systems as described in the Technical Background section above, but the disclosure is not limited to its use in this particular exemplary communication networks.

The term "active" and "becoming active" used in the claims and in the description refers to the operation of the mobile terminal in the discontinuous reception mode, where the mobile terminal wakes up and becomes active for an on-duration of time, so as to, e.g., perform and report measurements and monitor the PDCCH. As such, the expression is equivalent to the one used in the standardization of LTE of the UE "entering Active Time."

One aspect of the disclosure is to improve the DRX operation of the mobile terminal with regard to the response time and battery consumption opportunity provided for the mobile terminal. To said end, the disclosure introduces an additional DRX cycle (in the following called DRX wake-up cycle), which runs in parallel to the DRX short and/or long cycle.

Figure 1:
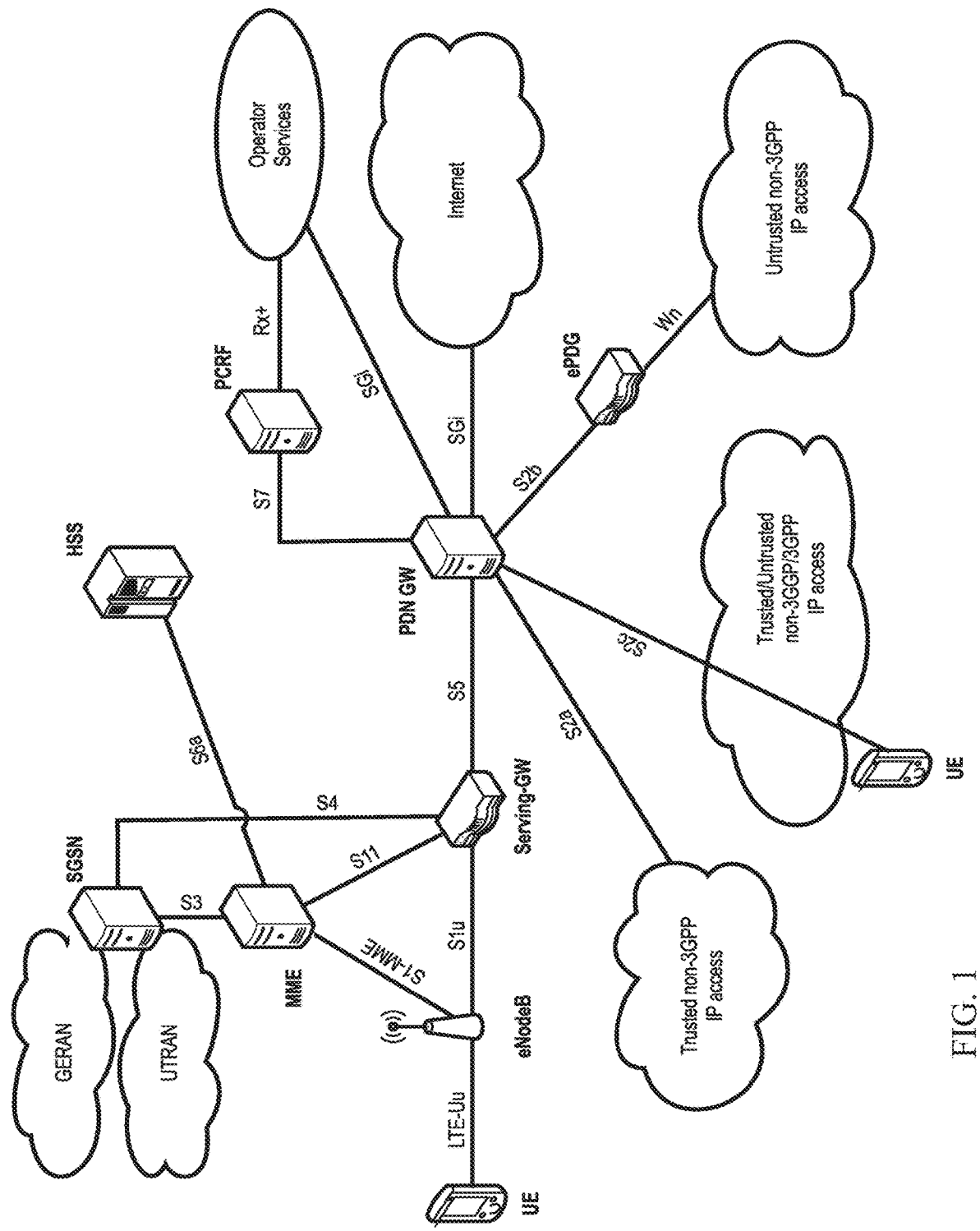
FIG. 1 shows an exemplary architecture of a 3GPP LTE system.
Figure 2:
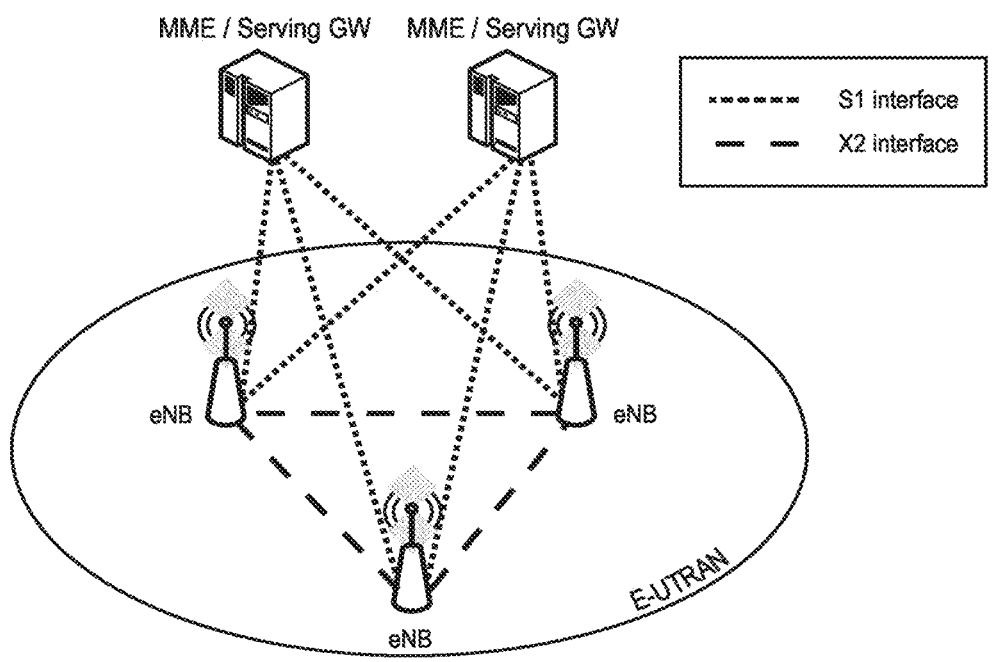
FIG. 2 shows an exemplary overview of the overall E-UTRAN architecture of 3GPP LTE.
Figure 3:
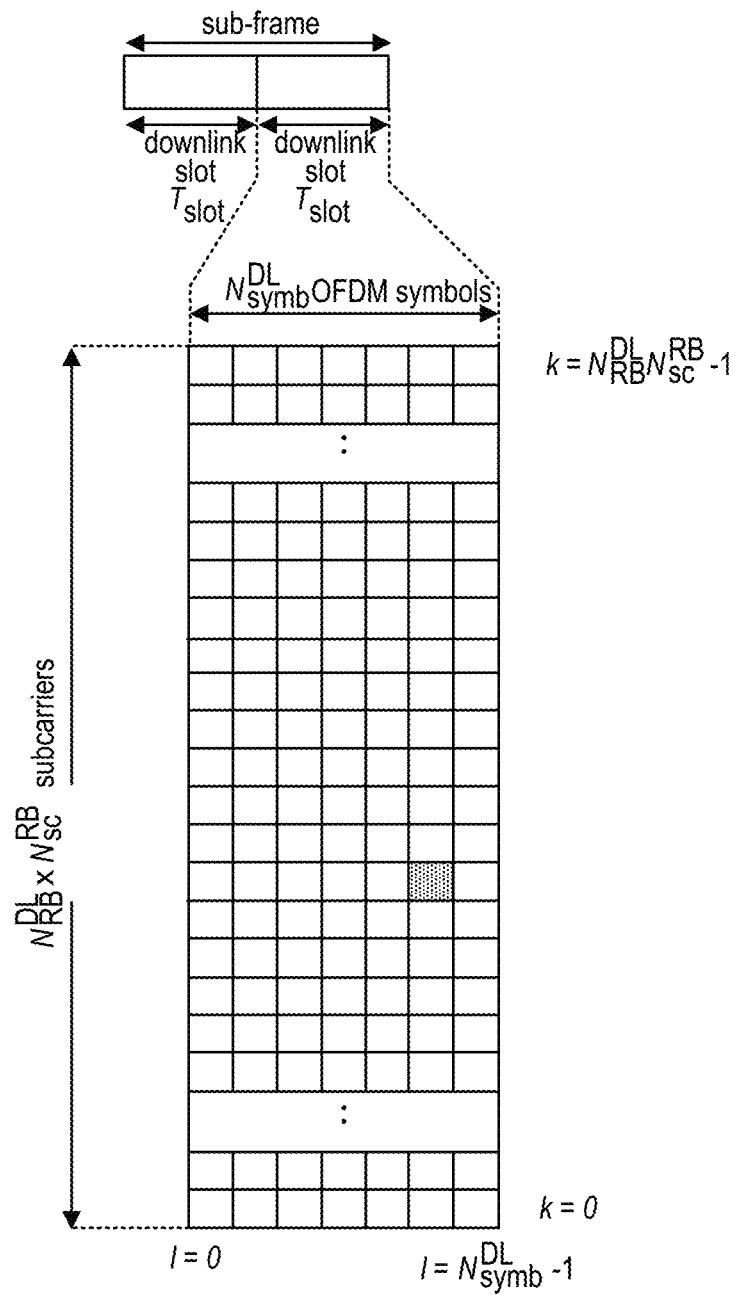
FIG. 3 shows exemplary subframe boundaries on a downlink component carrier as defined for 3GPP LTE (Release 8/9)
Figure 4:
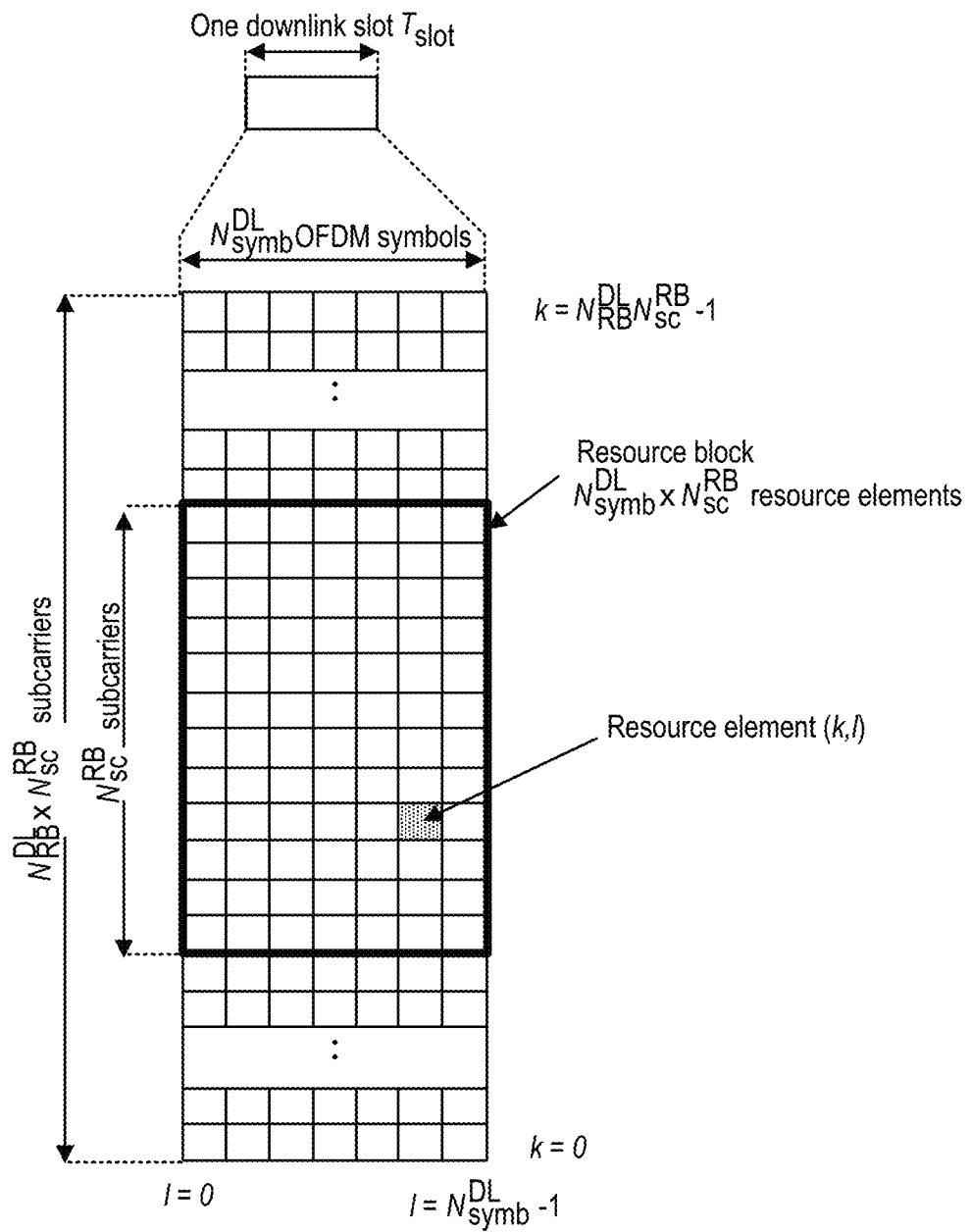
FIG. 4 shows an exemplary downlink resource grid of a downlink slot as defined for 3GPP LTE (Release 8/9)
Figure 5:
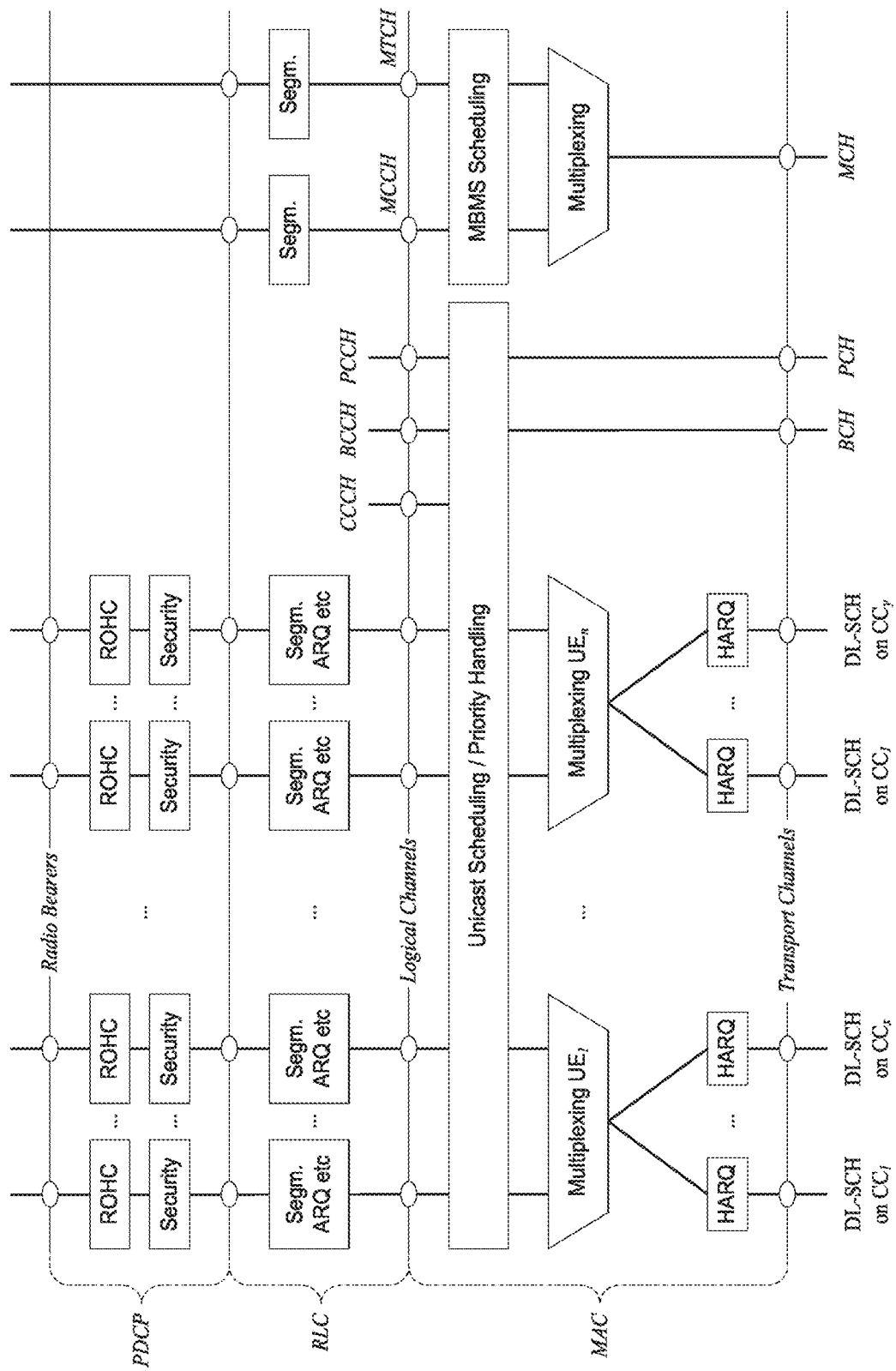
FIGS. 5 & 6 show the 3GPP LTE-A (Release 10) Layer 2 structure with activated carrier aggregation for the downlink and uplink, respectively.
Figure 6:
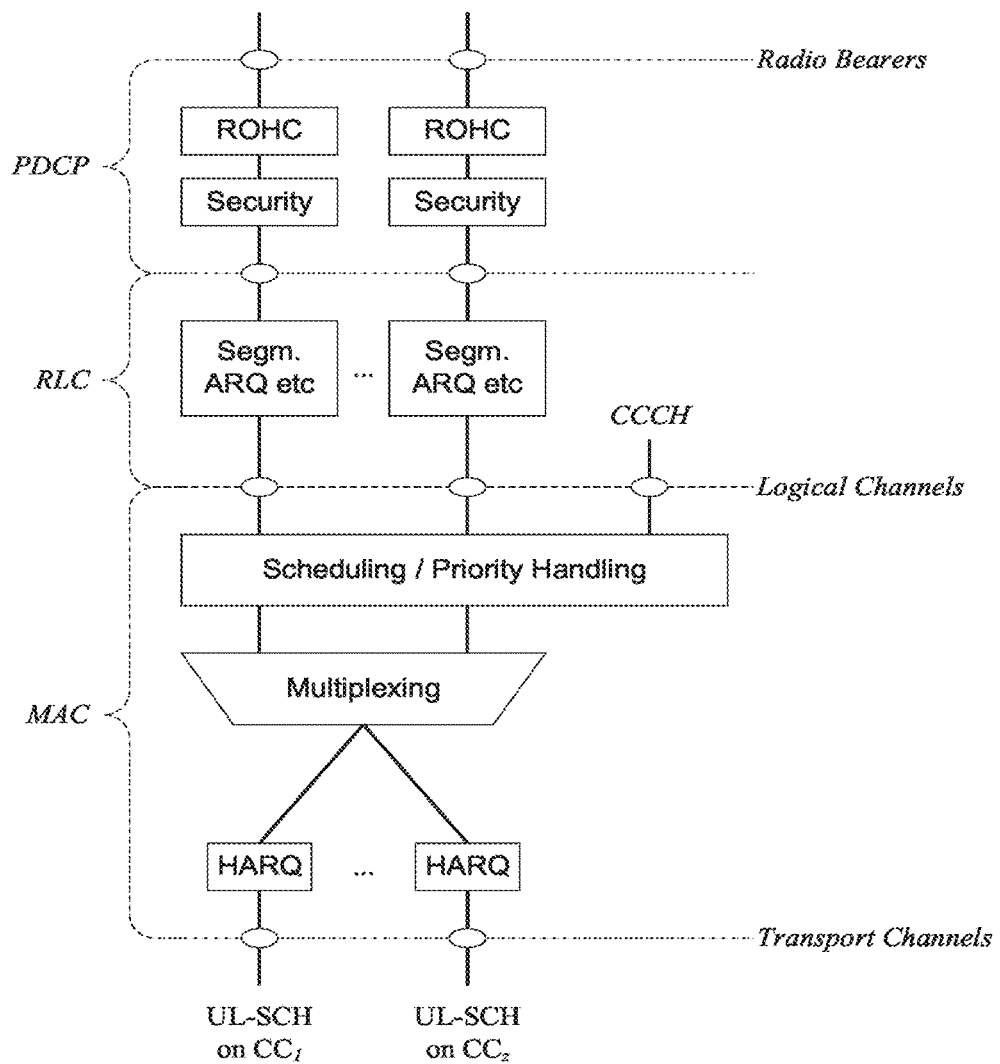
Figure 7:
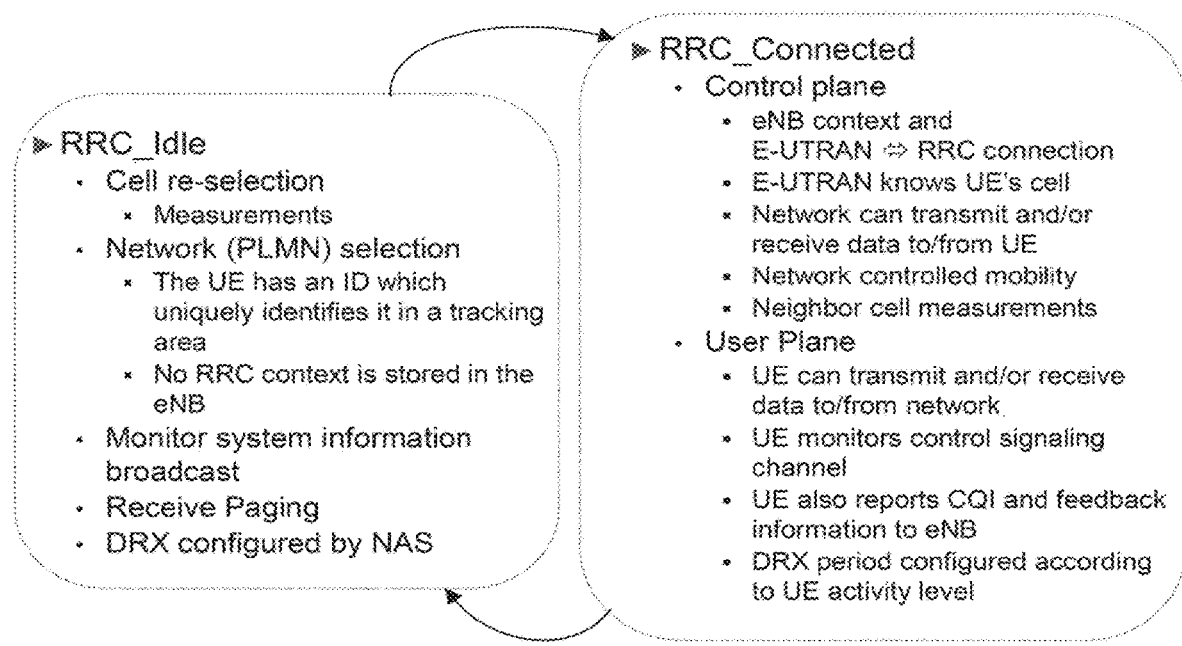
FIG. 7 shows a state diagram for a mobile terminal and in particular the states RRC_CONNECTED and RRC_IDLE and the functions to be performed by the mobile terminal in these states.
Figure 8:
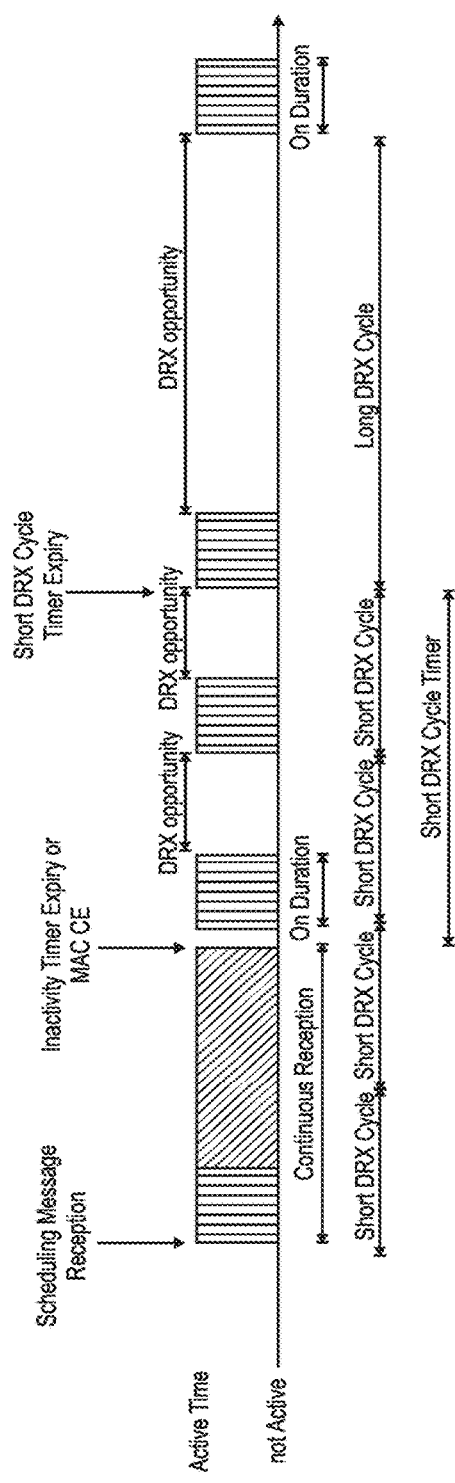
FIG. 8 illustrates the DRX operation of a mobile terminal, and in particular the DRX opportunity, on-duration, according to the short and long DRX cycle.
Figure 9:
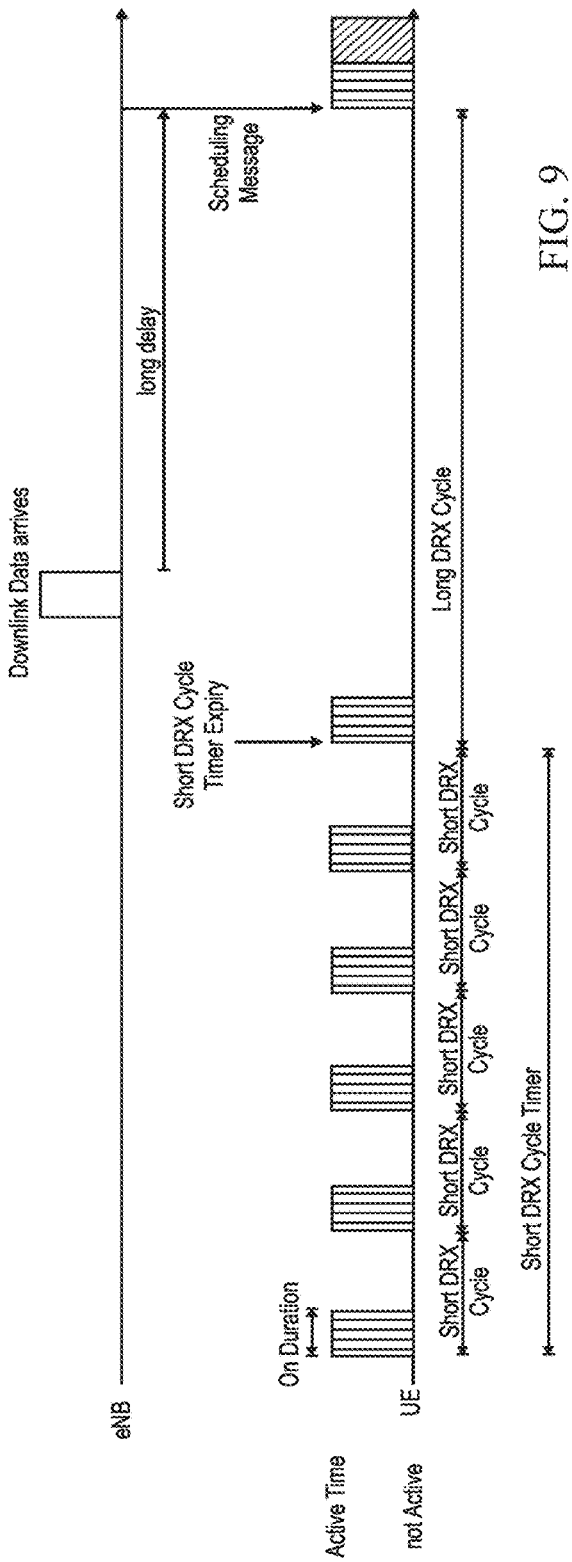
FIGS. 9 & 10 illustrate the tradeoff between the battery saving opportunities given to the UE by the DRX operation and the response time to scheduling by the base station.
Figure 10:
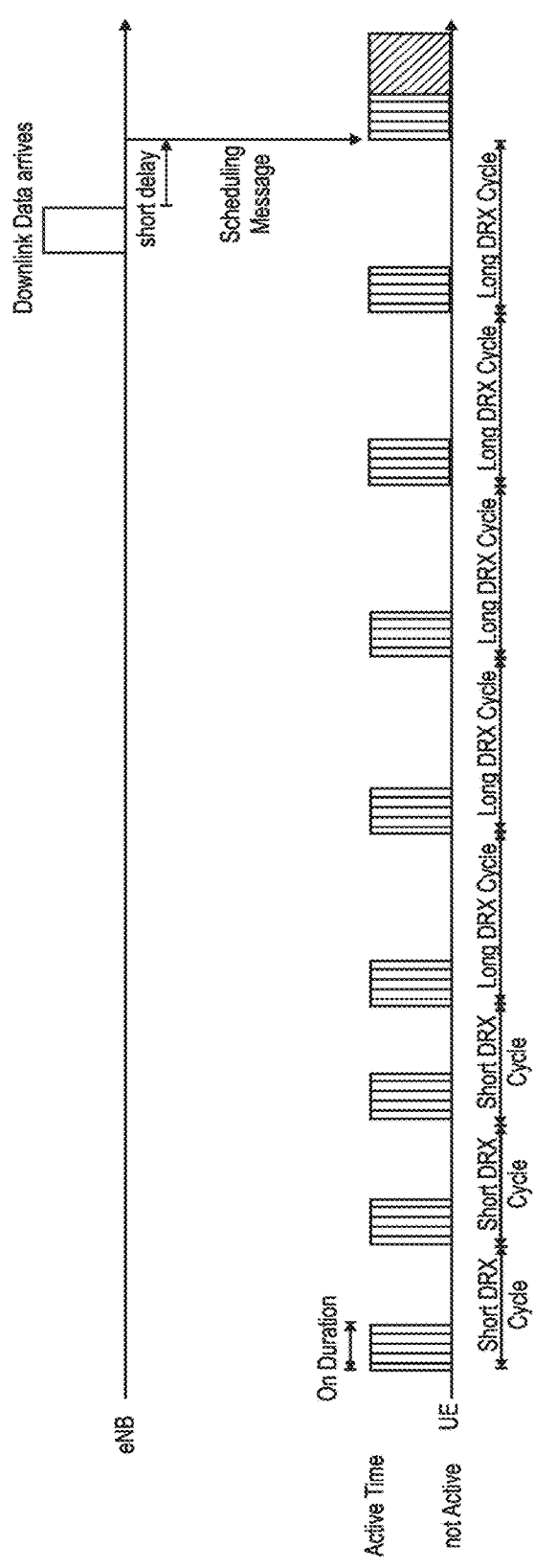
Figure 11:
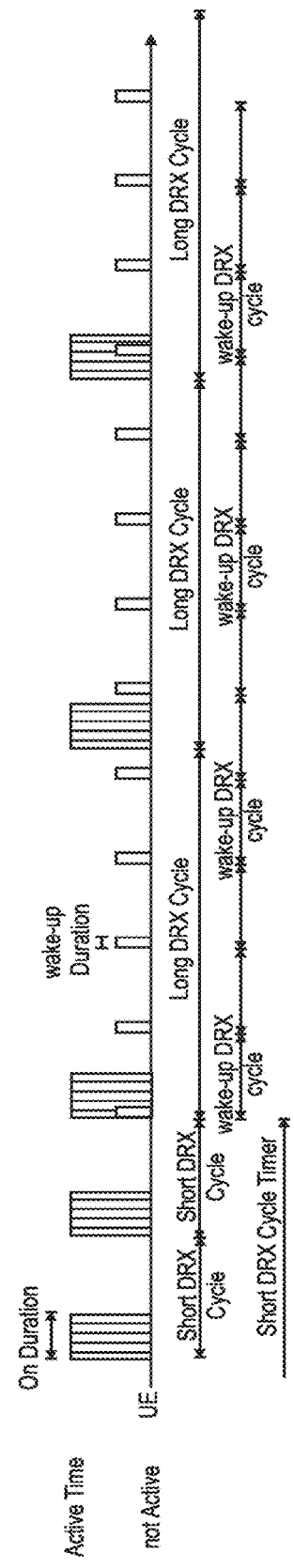
FIG. 11 illustrates the DRX operation of a mobile terminal including the additional DRX wake-up cycle according to one embodiment of the disclosure.

FIG. 11 illustrates the DRX wake-up cycle, in parallel to the DRX long cycle, according to one embodiment of the disclosure, and will be used exemplary to explain the concepts behind the disclosure. FIG. 11 is to be regarded as only exemplary and thus shall restrict the scope of protection of the disclosure to this particular embodiment.

The disclosure allows maintaining the UE operation for the DRX short cycle and DRX long cycle unchanged compared to the standard. The DRX wake-up cycle introduced by this disclosure runs in parallel to the DRX short and/or long cycle.

As apparent from FIG. 11, the DRX wake-up cycle runs in parallel with only the DRX long cycle, and not the DRX short cycle. Correspondingly, the operation of the mobile terminal according to the DRX wake-up cycle is thus started at basically the same time as the one for the DRX long cycle, namely upon expiry of the Short DRX cycle Timer. Alternatively, the DRX wake-up cycle may start with a predetermined time offset compared to the DRX long cycle (not shown).

According to another embodiment not depicted in FIG. 11, the DRX wake-up cycle may start at the same time as the one for the DRX short cycle, i.e., upon expiry of the Inactivity Timer or when receiving a corresponding MAC CE from the base station. In addition, a time offset can be implemented compared to the DRX short cycle, which the mobile terminal waits before starting operating according the DRX wake-up cycle too. A corresponding offset parameter for starting the DRX wake-up cycle may be called wake-upDRX-CycleStartOffset and can assume any particular number of subframes, e.g., between 0 and the actual cycle length of the DRX wake-up cycle.

According to a further embodiment not depicted in FIG. 11, the DRX wake-up cycle may start at the same time as the one for the DRX short cycle, i.e., upon expiry of the Inactivity Timer or when receiving a corresponding MAC CE from the base station and end again after the expiry of the Short DRX Cycle timer. In addition, as described above, a time offset can be implemented compared to the DRX short cycle, which the mobile terminal waits before starting operating according the DRX wake-up cycle too.

According to another embodiment not depicted in FIG. 11, the DRX wake-up cycle may start at the same time as the one for the DRX short cycle only upon reception of a corresponding MAC CE from the base station, i.e., only when the mobile terminal entered DRX short cycle commanded from eNodeB. The usage of the DRX wake-up cycle will end again after the expiry of the Short DRX Cycle timer.

With reference to FIG. 11, the DRX wake-up cycle and the DRX long cycle simultaneously start with the expiry of the Short DRX Cycle Timer. After a time interval defined for the DRX wake-up cycle, the mobile terminal starts monitoring the control regions for one subframe for PDCCH-s destined to itself, which means for PDCCHs masked with one of the RNTIs assigned to the mobile terminal. Correspondingly, the mobile terminal powers the necessary radio parts and performs various blind decoding attempts to check whether any message (any DCI format) is present for itself in this one subframe within the monitored control region. It should be noted that the mobile terminal only performs the monitoring of the control region of the subframe for PDCCHs without performing any other operation.

If the mobile terminal does not find any message, it continues in the DRX mode and waits during the time interval of the DRX wake-up cycle until it again starts monitoring for the PDCCH for the wake-up duration of one subframe. This is repeatedly performed by the mobile terminal until the mobile terminal enters into Active Time, because it detects a PDCCH message destined to itself during the on-duration of the DRX short/long cycle or during the wake-up duration of the DRX wake-up cycle.

It should be also noted that the behavior of the mobile terminal when it receives a PDCCH message during the wake-up duration of the DRX wake-up cycle is the same as its behavior when it receives a PDCCH message during the on-duration of the DRX short/long cycle. In both cases, the mobile terminal becomes active, i.e., enters Active Time in the next subframe (when the previous subframe was a wake-up duration) or stays in Active time (if the previous subframe was a DRX on-duration), e.g., according to the message received in the PDCCH.

As apparent from FIG. 11, the time intervals between the wake-up opportunities provided in the DRX wake-up cycle are much shorter than the time intervals between the on-durations of the DRX long cycle. Though this is not strictly necessary, the DRX wake-up cycle should be shorter than the DRX long cycle to provide the advantage of improving the response time compared to only operating according to the DRX long cycle.

In one embodiment of the disclosure, the DRX wake-up cycle interval (i.e., the interval between the wake-up durations) can be the same as the one configured for the DRX short cycle. Correspondingly, in this case the DRX wake-up cycle would reuse the parameter shortDRX-cycle defined for the DRX short cycle. Alternatively, a separate parameter may of course be defined for the DRX wake-up cycle, for example a wake-upDRX-cycle parameter which can assume any particular number of subframes, e.g., between 2 and 640 subframes in 16 steps, as with the shortDRX-cycle.

Similarly, the wake-up duration of the DRX wake-up cycle might be as long as the on-duration of the DRX short/long cycle, thus being also configured by the onDurationTimer parameter. Though a long wake-up duration allows the base station more flexibility in transmitting the PDCCH message to the mobile terminal, the battery consumption is increased with every subframe for which the mobile terminal monitors the PDCCH, which has an impact on the battery due to the comparatively short DRX wake-up cycle. Thus, alternatively and more advantageously, the wake-up duration of the DRX wake-up cycle should be much shorter (e.g., one subframe) and could be configured by a separate parameter, e.g., called wake-upDurationTimer, which can assume a low number of subframes such as between 1 and 8 subframes in 8 steps.

The measurement and reporting requirements (e.g., intra-frequency, inter-frequency, inter-RAT, CQI reporting) are still depending on the length of the intervals of the DRX long cycle as explained in detail in the Background Section; the measurement and reporting requirements are not depending or influenced by the DRX wake-up cycle of the disclosure. Correspondingly, while the mobile terminal has the opportunity of waking-up more often, it does not need to perform measurements or reporting so often. The mobile terminal performs the necessary measurements during the DRX opportunities given by the Long DRX cycle depending on UE implementation; e.g., intra-frequency measurements during the on-duration, for inter-frequency measurements in one of the DRX opportunities the mobile terminal powers up its RF part, retunes the RF part to the corresponding frequency and performs the inter-frequency measurements.

The behavior of the mobile terminal during the wake-up duration is different from the one during the on-duration. While the mobile terminal during the on-duration is considered to be active, i.e., be in active time, the mobile terminal during the wake-up duration is not as such active; it merely powers up the necessary parts to monitor the downlink control region for PDCCHs addressed to its assigned RNTIs, this procedure including the blind decoding of the various DCI formats. During the wake-up duration, the mobile terminal does not have to perform any reporting of CSI or other measurements; it thus only monitors for the PDCCHs.

In case the wake-up duration according to the DRX wake-up cycle falls on a subframe which is also part of the on-duration according to one of the other DRX short/long cycle (as in FIG. 11), the UE behavior follows the one of the DRX short/long cycle. In other words, when the wake-up duration and the on-duration fall together (or overlap for some subframes) the DRX wake-up duration is overwritten by the on-duration of the DRX short/long cycle. Basically, since the mobile terminal during every subframe of the on-duration monitors for PDCCHs (in the same way as it does during the wake-up duration), the functioning of the DRX wake-up cycle is not affected by this coincidence of on-duration and wake-up duration.

Figure 12:
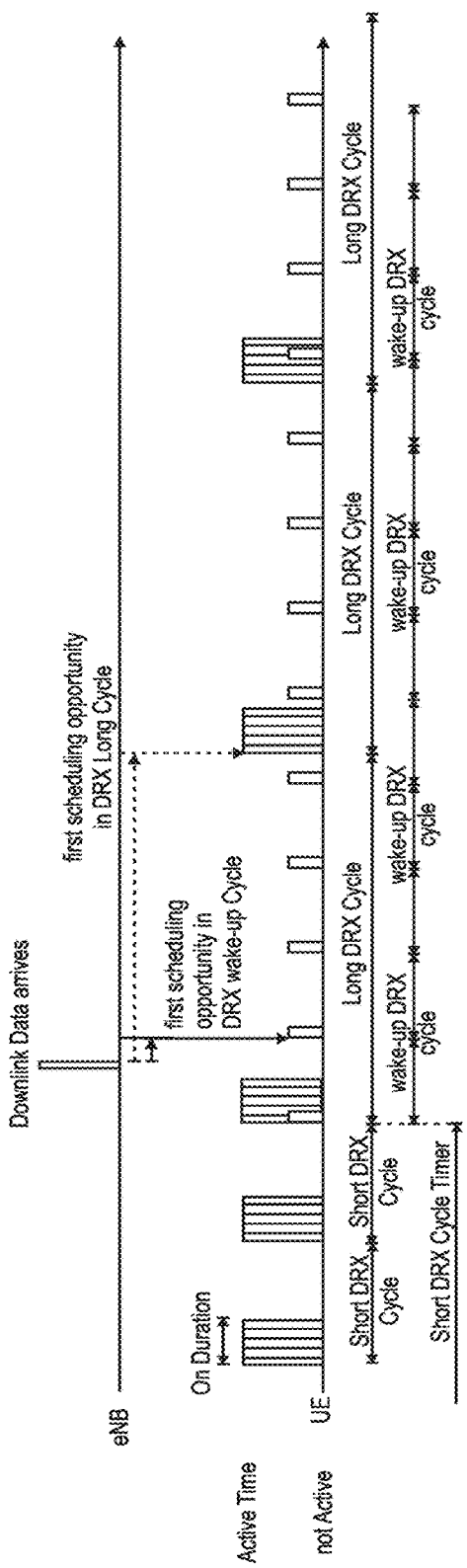
FIG. 12 illustrates the parallel operation of the DRX wake-up cycle and the DRX long cycle, and the corresponding response times in case downlink data arrives at the base station for the mobile terminal.

FIG. 12 discloses one example of the different scheduling opportunities given by the DRX wake-up cycle and the DRX Long Cycle, for the case where downlink data for the mobile terminal arrives shortly after entering the DRX Long/wake-up Cycle. As can be appreciated from said FIG. 12, according to the present disclosure the base station can schedule the mobile terminal shortly after receiving the downlink data using the wake-up duration of the mobile terminal as an opportunity to transmit a PDCCH DCI format 1 for example. It is of course assumed that the base station is not hindered by any other operation (e.g., scheduling other mobile terminals) and can indeed exploit this wake-up opportunity given by the wake-up duration of one subframe.

In contrast thereto, FIG. 12 alternatively (in dashed lines) depicts the case where the mobile terminal is scheduled using the on-duration of the DRX long cycle; the base station needs to wait for a longer time to be able to schedule the mobile terminal, and thus the response time for the mobile terminal is rather long.

Figure 13:
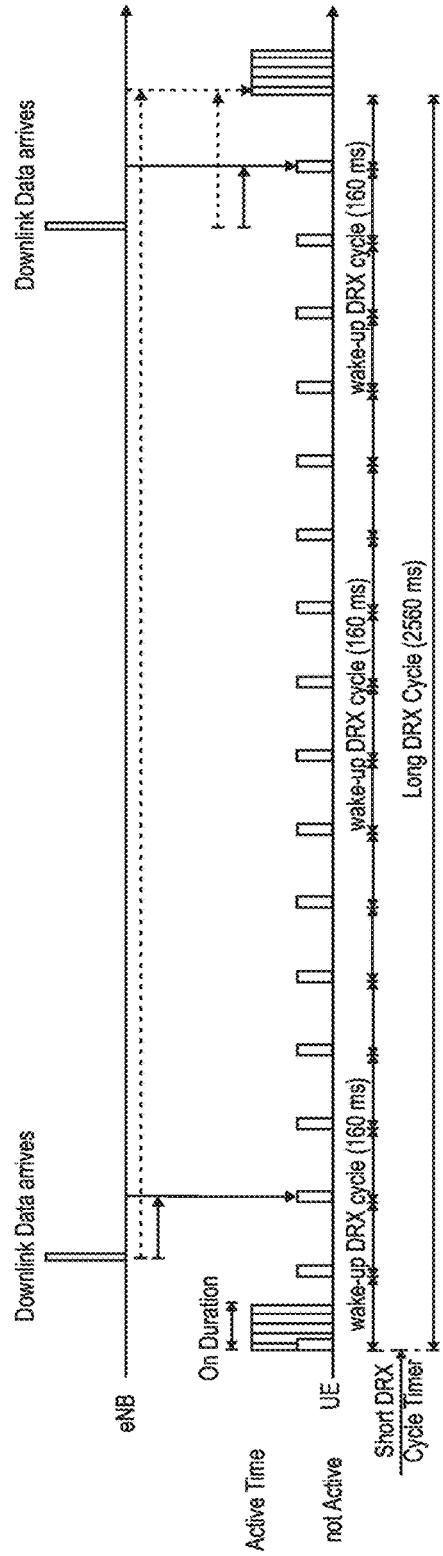
FIG. 13 illustrates a DRX long cycle of 2560 subframes and a DRX wake-up cycle of 160 subframes and depicts the gain in response time that can be achieved by the parallel DRX wake-up cycle.

With reference to FIG. 13 a quantitative example is given to compare the functioning of the DRX wake-up cycle of one embodiment of the disclosure with the one of the DRX long cycle. In the example of FIG. 13 it is assumed that the DRX wake-up cycle starts at the same time and in parallel to the DRX long cycle. The DRX wake-up cycle is assumed to be 160 subframes, and the DRX long cycle is configured to be 2560 subframes; the on-duration is considered to be 4 ms (i.e., 4 subframes), and the wake-up duration is one subframe.

As apparent from FIG. 13 data arrives shortly after the first wake-up duration of the mobile terminal, assumed one subframe after the end of the wake-up duration, which can be regarded as being the worst case for the DRX wake-up cycle. Correspondingly, the base station has to wait at least 159 subframes (ms) for the first wake-up opportunity given by the subsequent second wake-up duration. Regarding the DRX long cycle, the base station would have to wait 2399 subframes (2560-161 subframes) for the first opportunity to schedule the mobile terminal using the on-duration of the mobile terminal. Accordingly, this is reduction of the delay of 2240 ms, or put in other words, only 6.6% of the delay for the DRX Long cycle.

In a second example downlink data arrives one subframe after the second-last wake-up duration, which is the example which yields a minimum gain of 160 ms as follows. According to the DRX wake-up cycle the downlink scheduling by the base station has to wait 159 ms; considering only DRX long cycle, the base station would have to wait 319 ms (160 ms+159 ms) to schedule the mobile terminal.

As already explained above, the reduced response time comes at the cost of only marginal additional power consumption, and will be explained in the following according to the above example of FIG. 13. The worst case scenario with regard to the power consumption is that no data is received during the DRX cycle. The mobile terminal has to power up its RF part for 15 additional subframes to monitor the PDCCH. The DRX long cycle having 2560 ms and a 4 ms on duration, allows a power reduction of 99.84% (1-4/2560). In contrast to a mobile terminal also performing according to the DRX wake-up cycle, the power reduction is 99.25% (1−19/2560), thus experiencing a power saving loss of only ~0.59%.

The above considerations however only refer to the theoretical power consumption of the mobile terminal. In reality, the mobile terminals needs to power up the RF part first, and then power down the RF part after the wake-up duration (or on-duration for that matter). In other words, there is a pre- and post wake-up duration, which lengths are dependent on UE implementation. In one realistic implementation, the pre wake-up duration can be assumed to be 5 ms, and the post wake-up duration could be 3 ms. Therefore, the wake-up duration spans 9 ms in total (5 ms+1 ms+3 ms), and the on-duration spans 12 ms in total (5 ms+4 ms+3 ms). Considering these "realistic" power consumption durations, the power reduction provided by the DRX long cycle alone is 99.53%, and the one for a parallel DRX wake-up cycle is 94.26% (1−(15*9/2560+12/2560)). The DRX wake-up cycle thus yields a power saving loss of 5.26%.

To further assess the advantage provided by the present disclosure, a comparison will be performed between the DRX wake-up cycle and a "short" DRX long cycle with regard to the measurement requirements that are to be fulfilled by the mobile terminal, and in particular only considering the intra and inter-frequency measurements. It is assumed that the DRX long cycle is 2560 ms long, and the DRX wake-up cycle runs in parallel. On the other hand it is assumed that the DRX long cycle is 160 subframes long, and the DRX wake-up cycle is not used. As explained before, the measurement and reporting requirements for the mobile terminal still follow the DRX long cycle, and are not influenced or changed by the DRX wake-up cycle which may run parallel to the DRX long cycle. No additional subframes for measurements are necessary regarding the DRX wake-up cycle.

Depending on the implementation of the mobile terminal, the subframes of the on-duration can be used for intra-cell measurements; thus if the on-duration is more than 5 subframes, no additional subframes are needed for intra-frequency measurements. In the following, this is however not considered for exemplary purposes; the mobile terminal is assumed to perform the intra-frequency measurements on subframes outside the on-duration.

When intra-frequency measurements and the corresponding neighbor cell identification are assumed to be performed in combination, the mobile terminal is required to spend power on four additional subframes every DRX cycle, assuming that the on-duration is at least one subframe and can be used for measurements.

On the other hand, assuming that the previous DRX long cycle was 2560 ms long, if the DRX long cycle is reduced to 160 subframes, to allow the same response time as with a DRX wake-up cycle of 160 subframes (see above), the mobile terminal has to spend 16*4 subframes in 2.56 seconds for the intra-frequency measurements and cell identification. Thus, there is a difference of 60 subframes which are spent for intra-frequency measurements when reducing the DRX long cycle to 160 ms.

With regard to inter-frequency measurements and corresponding cell identification, the mobile terminal is required to spend power on 6 additional subframes every 2.56 seconds, in case of a DRX long cycle of 2560 subframes.

On the other hand, if the DRX long cycle is reduced to 160 subframes, the mobile terminal has to spend 16*6 subframes for inter-frequency measurements in 2.56 seconds. This implies 90 additional subframes.

Therefore, only considering intra-frequency and inter-frequency measurement requirements, a short DRX long cycle of only 160 subframes would require 150 additional subframes to perform the necessary intra/inter-frequency measurements and cell identifications. This means a penalty of 5.86% (150/2560) for the power consumption of the mobile terminal, only due to complying with the increased measurement requirements. Put differently, the implementation of the DRX wake-up cycle according to one embodiment of the disclosure allows saving 150 subframes that would be necessary for performing the intra-frequency and inter-frequency measurements in case the DRX long cycle is configured to be 160 subframes. Therefore, instead of using 160 subframes, only 10 subframes are necessary when applying the DRX wake-up cycle of 160 subframes with a DRX long cycle of 2560 subframes; this means a power reduction for measurements of 93.75% (150 subframes/160 subframes).

Further assuming an on-duration of 4 ms, and the pre and post wake-up duration of additional 8 ms per on-duration, in 2560 subframes the mobile terminal would have to use 12*16 subframes for the on-duration and 150 subframes for the measurements. Thus, 342 subframes out of the 2560 subframes would be spent, and could not be used by the mobile terminal to save power. Thus, the DRX power saving is reduced to only 86.64% in this case.

In truth, the power saving loss for complying with the requirements for measurements is higher, since the mobile terminal does not only have to perform the intra-frequency and inter-frequency measurements but other measurements as well, such as inter-RAT, CQI, SRS . . .

It should thus be noted that the requirements for cell measurements are greatly increased with a short DRX long cycle, which is avoided by the disclosure.

Similar to the DRX configuration of the prior art, the DRX wake-up cycle can be configured for the mobile terminal also by the base station, e.g., using RRC messages using the configuration parameters already explained in above paragraphs. Thus, the eNodeB knows the DRX wake-up cycle of each mobile terminal and can thus use the scheduling opportunities provided by the corresponding wake-up duration subframe(s) to schedule the mobile terminal and/or transmit small data.

One drawback of the embodiments of the disclosure is that the base station may not have current information on the channel quality available for the mobile terminal, thus making the scheduling by the base station less efficient since it cannot be based on the current channel state. Since the measurement and reporting requirements are linked to the DRX long cycle and not the DRX wake-up cycle, the mobile terminal correspondingly does neither measure nor report channel quality information to the base station as frequently as might be necessary. The base station has the opportunity to send downlink data to the mobile terminal, besides the corresponding PDCCH message for the downlink data, in the subframe of the wake-up duration. Since the base station does not know the channel state it can preferably use a conservative modulation and coding scheme to compensate for the missing channel quality information and to thus make sure that the downlink data is received correctly in the mobile terminal.

Consequently, the base station can forward small amounts of downlink data with only a small delay to the mobile terminal, and this also in the absence of any channel quality information.

Furthermore, the mobile terminal might be configured to measure the channel and to transmit channel quality information besides the uplink data to the base station, in case it gets a DCI format 0 message on the PDCCH. This is particularly useful since the base station otherwise lacks the information of the channel state as just explained above. The mobile terminal would thus perform the necessary measurements on the channel and would use the uplink grant assigned with the DCI format 0 message, to transmit the CQI to the base station. Of course, this depends also on whether the UE does have enough time for the channel measurements before the uplink grant is due.

Variants

As explained in the background section, several DCI formats are transmitted on the PDCCH, and the mobile terminal has to perform various blind decoding attempts to identify these PDCCH messages when monitoring for the PDCCHs. In the previous embodiments it is assumed that the mobile terminal monitors the PDCCH during the wake-up duration in the same way, as the mobile terminal does for the on-duration; namely, the UE monitors basically all DCI formats, one part in the common search space and the other part in the UE-specific search space as explained in detail in the background section.

In the following embodiment of the disclosure, it is assumed that for the wake-up duration the mobile terminal shall monitor the PDCCH not for all kind of DCI formats, but only for a reduced set thereof. In other words, the mobile terminal monitors the PDCCH during the wake-up duration for only pre-determined messages destined to itself.

In one exemplary embodiment of the disclosure, the DCI formats to be monitored is limited to only DCI formats 0, 1A, 3 and 3A. As apparent from the background section, these DCI formats have the same size (namely 42 bits), and thus the mobile terminal needs to perform the blind decoding for only one DCI size, which reduces the number of blind decoding attempts that the mobile terminal needs to perform. The DCI formats 0, 1A, 3 and 3A allow uplink and downlink scheduling as well as providing Transmit Power Control commands to the mobile terminal.

Other restrictions with regard to the DCI formats are possible as well. For example, the mobile terminal might be configured to only monitor for one DCI format, e.g., for DCI format 0 thus limiting the mobile terminal to uplink assignments only, or for DCI format 1A, limiting the mobile terminal to downlink assignments only. This has the advantage that the mobile terminal needs to be readied only for one type of transmission which is known in advance.

In addition or alternatively, the mobile terminal may ignore all DCI formats that do not contain a code point for indicating a CQI-only assignment. A code point for CQI-only tells the mobile terminal that it should perform channel measurements and report the CQI to the base station without informing the MAC layer of either reception or transmission of a transport block. The mobile terminal will use a control channel (PUCCH) for sending the CQI to the base station since no other uplink resource was provided to the mobile terminal Thus, the base station can specifically request a CQI from the mobile terminal, particularly in those cases where downlink data is to be transmitted to the mobile terminal and the base station wants to first learn the channel state before forwarding the data to the UE. However, the step of first requesting the UE to perform measurements and report the CQI introduces an additional delay of ~6 ms-8 ms for forwarding the downlink data to the mobile terminal.

However, this 6-8 ms delay corresponds roughly to the time necessary for an SCell to wake up. Thus, this delay may not be detrimental for those cases where the SCell is involved.

In another embodiment of the disclosure the aggregation levels that the mobile terminal is to monitor for PDCCH is limited. As explained in the background section, the PDCCH format defines the number of CCEs that are used for transmitting the PDCCHs; either 1, 2, 4 or 8 CCEs may be used, e.g., depending on the channel conditions (8 CCEs is most robust, 1 CCE is least robust). However, when the PDCCH is transmitted using a low number of CCEs this forces the mobile terminal to perform a lot of blind decoding to scan the search space for the PDCCH message. Correspondingly, in order to limit the effort by the UE for blind decoding the PDCCH format to be monitored can be limited, e.g., to just PDCCH formats 2 and 3, meaning 4 and 8 CCEs are used only, or to just PDCCH format 3, meaning that messages with 8 CCEs are to be checked only.

A further option to reduce the blind decoding attempts at the mobile terminal, is to limit the monitoring of the PDCCH to only the common search space or the mobile terminal specific search space.

The above embodiments of limiting the monitoring of PDCCH, with regard to a reduced set of DCI formats, predetermined PDCCH formats and one of the search spaces, can be combined as well to further reduce the power spent by the UE on blind decoding.

When introducing the DRX wake-up cycle, there will be several mobile terminals monitoring the PDCCH during a given subframe. In view of that the probability of false alarm in LTE is just found acceptable, reducing the blind decoding attempts according to one or a combination of the above embodiments helps reducing the false alarm rate further.

For the following it is assumed that carrier aggregation is applied for the UE, such that it has a primary cell (PCell) and one or several secondary cells (SCell). The DRX operation according to the prior art is valid for the complete UE, thus for the PCell and any other (activated) SCell(s). Correspondingly, the UE would operate according to the DRX short/long cycle in each PCell, SCell separately and would monitor the PDCCH of the PCell and the one of each SCell according to the currently active DRX cycle.

In one embodiment of the present disclosure, the operation of the DRX wake-up cycle can be the same in the PCell as in any of the SCells; this means that the mobile terminal not only performs the DRX wake-up cycle, according to one of the above described embodiments, in the PCell but also in each of the SCells.

According to another embodiment of the disclosure, the UE may however be configured such that the DRX wake-up cycle is only performed in the PCell but not in any of the SCell(s); the DRX short/long cycle would still be applied for the SCell, however the DRX wake-up cycle operation not. In other words, during the DRX wake-up duration the mobile terminal only monitors the PDCCH on the PCell.

Figure 14:
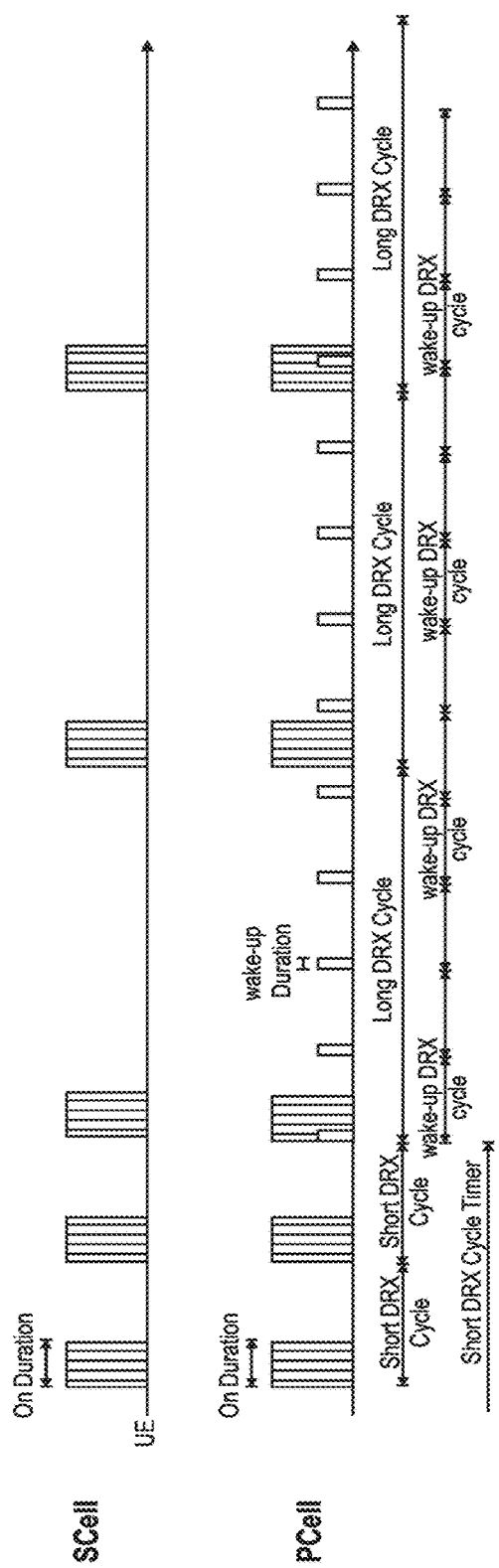
FIG. 14 illustrates the DRX operation in the PCell and SCell according to another embodiment of the disclosure, where the DRX wake-up cycle is only operated on PCell but not on SCell.

This is illustrated using FIG. 14, which depicts the PCell and one SCell. As apparent therefrom, the operation of the DRX short/long cycle is the same on the PCell and the SCell and is not different from the operation according to the prior art. On the other hand, it can be appreciated from FIG. 14 that according to the present embodiment of the disclosure, the UE operates according to the DRX wake-up cycle only on the PCell, according to one of the previous embodiments of the disclosure; in this case for example, it starts the DRX wake-up cycle with the DRX long cycle and without any offset.

This allows saving further power since the UE does not need to monitor for PDCCHs on the SCell. This makes especially sense in case the SCell is on another frequency (with interband aggregation) since the radio head (radio frequency part) of the mobile terminal can thus be turned off for the SCell.

Cross-carrier scheduling allows the PDCCH of a component carrier to schedule resources on another component carrier. For this purpose a component carrier identification field is introduced in the respective DCI formats, called CIF. However, cross carrier scheduling might not be supported when the DRX wake-up cycle is only implemented in the PCell, since the SCell requires a wake-up period to be able to decode messages.

Figure 15:
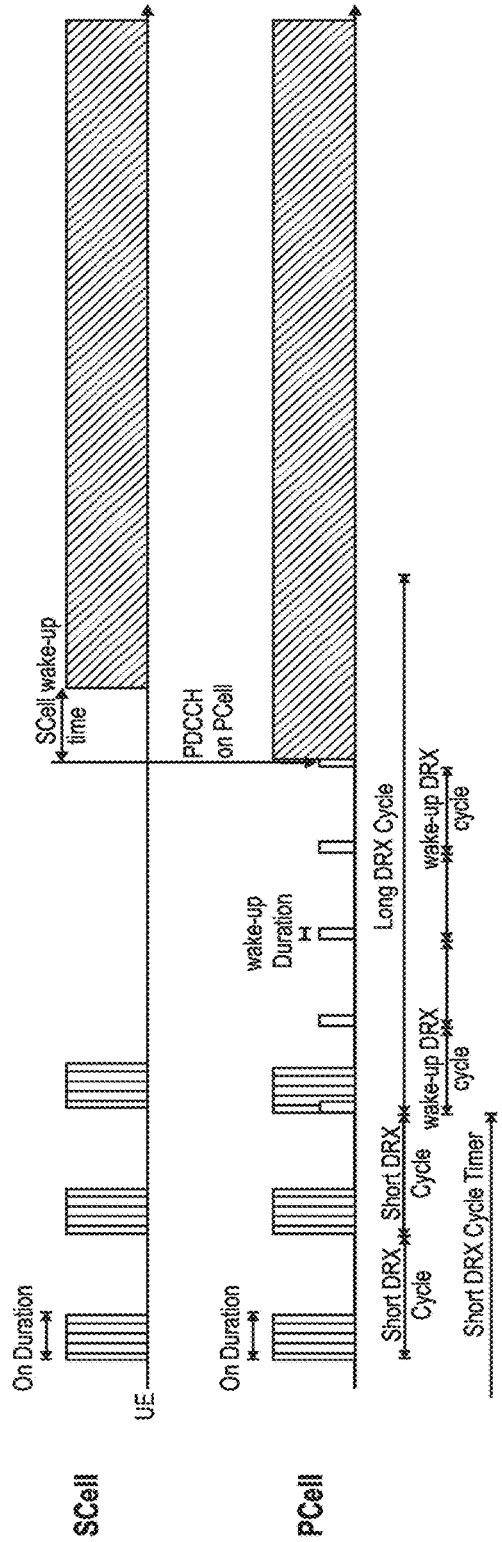
FIG. 15 illustrates the DRX operation in the PCell and SCell and in particular the wake-up time of the SCell when receiving a PDDCH on the PCell.

This is depicted in FIG. 15, displaying the SCell wake-up time necessary after receiving a corresponding PDCCH message on the PCell. The SCell can be ready for scheduling after ~8 ms (similar to the time necessary for activating a previously deactivated SCell).

Therefore, in case a scheduling message for the SCell is received on the PDCCH on the PCell, the downlink data on the same subframe of the SCell cannot be decoded by the UE. In case an uplink scheduling message for the SCell is received on the PDCCH on the PCell, the UE might still not have enough time to wake-up the SCell in time to prepare and send the uplink data via the SCell.

Correspondingly, in one embodiment of the disclosure the mobile terminal ignores cross scheduling messages, i.e., PDCCH messages with the carrier indicator pointing to one of the SCells.

According to still another embodiment of the disclosure, the mobile terminal does not monitor the complete cell bandwidth of a cell when monitoring the PDCCH during the wake-up duration of the DRX wake-up cycle, but restricts the monitoring to only part of the cell bandwidth. Assuming that the cell has an frequency bandwidth of 5 MHz, it has been assumed before that the mobile terminal does also receive the cell over its complete bandwidth of 5 MHz, when monitoring for PDCCHs using all of the available 5 MHz. However, in order to further save battery power, the mobile terminal may only monitor part of the cell bandwidth, e.g., 1.4 MHz around the center frequency of the subband. Usually, the System Information is transmitted in the 1.4 MHz subband around the center frequency.

The eNodeB of course needs to transmit messages to the mobile terminal in this reduced frequency subband of 1.4 MHz so that the mobile terminal is able to decode the messages when monitoring the PDCCH.

Furthermore, when the frequency bandwidth is limited as explained above, the eNodeB might send an Active Bandwidth Indicator to the mobile terminal in this limited frequency bandwidth. When the mobile terminal detects the Active Bandwidth Indicator, it returns the reception bandwidth to the regular cell bandwidth of, e.g., 5 MHz. Therefore, in future occurrences of the wake-up durations of the DRX wake-up cycle, the UE monitors the complete frequency bandwidth. Alternatively, the Active Bandwidth Indicator can be understood by the UE as a trigger to enter Active Time.

A further embodiment of the disclosure relates to limiting the occurrences of the DRX wake-up duration, as will be explained in more detail below. For example smartphones run several applications at the same time, while not actively using them. The applications receive keep-alive packets in order to maintain connectivity with the network. These keep-alive packets may arrive with a "combined" periodicity and a particular variance around this periodicity. The exact determination of the arrival of the keep-alive packets is difficult, and such a packet shall not be delayed until the next on duration of the DRX long cycle.

Usually, the DRX long Cycle is configured such that the DRX on-durations are placed at the expected arrivals of the keep-alive packets.

While the UE can assist the eNodeB to adapt the DRX long cycle with statistics information regarding the keep-alive packets arrival, it would be advantageous to also allow for the variance of the keep-alive packets. The active time of the UE and the DRX short cycle are not enough since they can take only care of packets arriving when a first packet was received in the on-duration during the DRX long cycle.

According to another embodiment of the disclosure, the DRX wake-up cycle is thus configured such that the UE operates according to the DRX wake-up cycle for only a limited amount of time; the occurrences of the wake-up duration of the DRX wake-up cycle are thus reduced.

According to one implementation of this embodiment, a wake-up duration enable timer is started when the DRX wake-up cycle starts. The UE monitors the PDCCH for the wake-up duration according to the time intervals given by the DRX wake-up cycle only when the wake-up duration enable timer is running. When the wake-up duration enable timer expires, the UE does not monitor the PDCCH even if it would according to the DRX wake-up cycle. The wake-up duration enable timer is reset every time the UE exists the Active Time of the on-duration of the DRX long cycle. This allows to only have occurrences of the DRX wake-up duration for a limited amount of time after the on-durations of the DRX long cycle.

Figure 16:
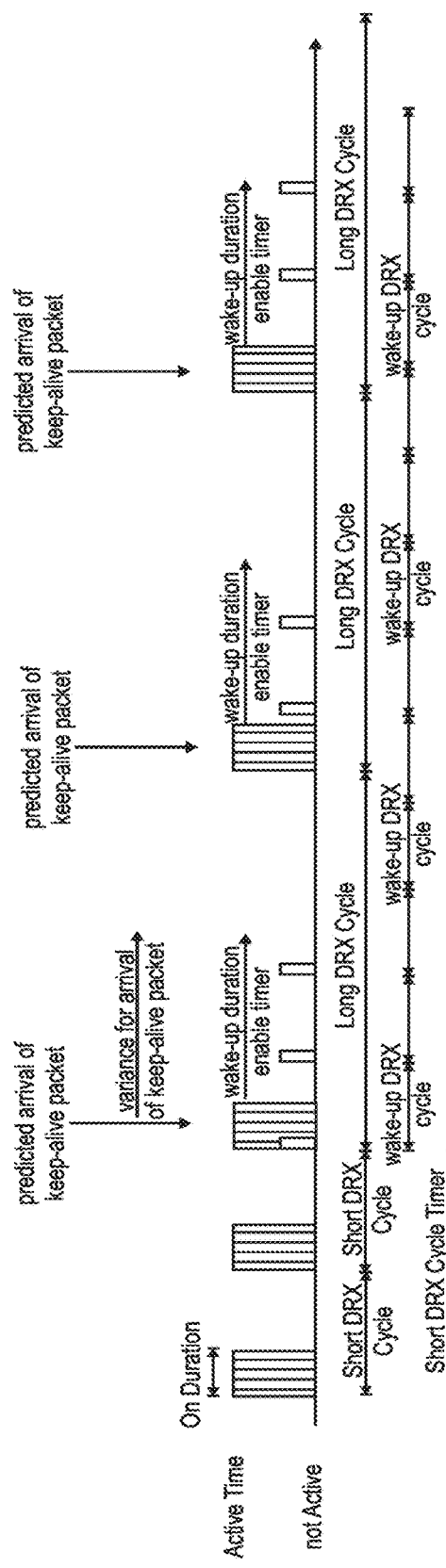
FIG. 16 illustrates the DRX operation according to another embodiment of the disclosure, including a wake-up duration enable timer.

This will be explained with reference to FIG. 16, which illustrates the wake-up duration enable timer running after the end of the on-duration of the DRX long cycle. As in previous embodiments of the disclosure, the DRX wake-up cycle is assumed to start at the same time as the DRX long cycle. With start of the DRX wake-up cycle the wake-up duration enable timer is started too for the first time.

The UE operates according to the DRX wake-up cycle as explained before, as long as the wake-up duration enable timer is still running. Correspondingly, every time the wake-up duration of the DRX wake-up cycle is imminent (i.e., the mobile terminal is due to monitor the PDCCH), the UE first checks the wake-up duration enable timer as to whether same is still running or whether it has already expired. The mobile terminal only monitors the PDCCH for the wake-up duration of time (as explained in previous embodiments) in case the wake-up duration enable timer is still running, i.e., has not yet expired. Otherwise, the UE will not monitor the PDCCH for the wake-up duration even if it would have to according to the DRX wake-up cycle. In FIG. 16 this yields that the mobile terminal only performs the PDCCH monitoring for two occurrences (instead of four) after the on-duration of the DRX long cycle.

Thus, in case keep-alive packets unexpectedly arrive after the expected time (during the on-duration), the DRX wake-up cycle allows further scheduling opportunities for the base station to forward the keep-alive packets to the mobile terminal. At the same time, the mobile terminal does not have to monitor the PDCCH for all wake-up opportunities of the wake-up duration, which saves further power.

Alternatively or in combination with the above, instead of having wake-up duration occurrences limited to only after the on-durations of the DRX long cycle, another embodiment allows to limit the wake-up duration occurrences to only before the on-durations of the DRX long cycle. Correspondingly, instead (or in addition) to the wake-up duration enable timer, a wake-up duration prohibition timer is implemented in the UE such that the UE only monitors the PDCCH for the wake-up duration of time according to the DRX wake-up cycle, when the wake-up duration prohibition timer is not running.

Figure 17:
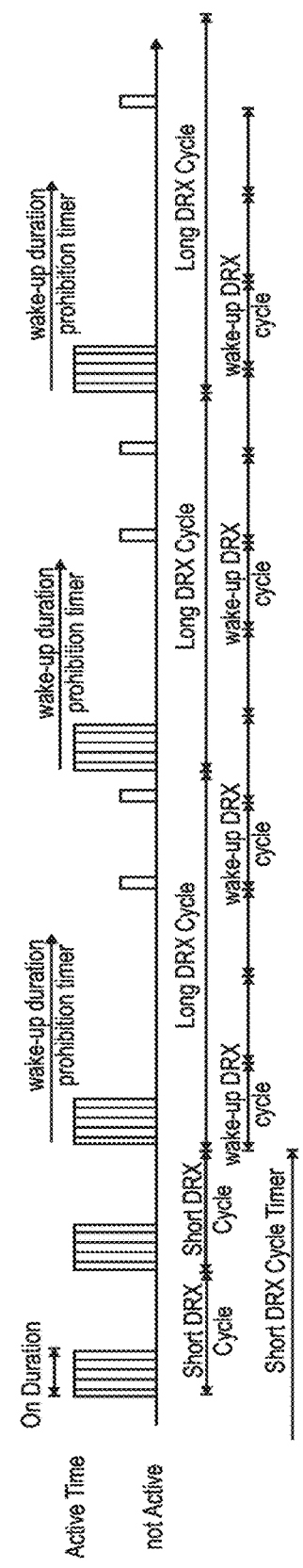
FIG. 17 illustrates the DRX operation according to another embodiment of the disclosure, including a wake-up duration prohibition timer.

This is illustrated in FIG. 17, where only two occurrences of the wake-up durations are depicted before the on-durations; the mobile terminal actually monitors the PDCCH only two times, since the first two wake-up opportunities are not used due to the running wake-up duration prohibition timer. In correspondence to the wake-up duration enable timer before, the wake-up duration prohibition timer is reset upon expiry of the on-duration of the DRX long cycle, upon exiting Active Time.

By using one or both of the timers explained above, it is possible to flexibly configure the DRX wake-up cycle so as to adapt to the circumstances and needs of the mobile terminal and at the same time to avoid waste of battery power for wake-up durations where no downlink packet is to be received.

FURTHER EMBODIMENTS

In further embodiments, the mobile terminal monitors the PDCCH during the paging occasions while being in DRX of RRC_CONNECTED state, as will be explained below.

In the current specification, the UE can monitor paging occasions also when being in the RRC_CONNECTED state, in order to be informed about System Information changes. The paging occasions occur more frequently than the on-durations in a DRX long cycle.

According to a further embodiment, the UE being in DRX long cycle may monitor the PDCCH for messages during the paging occasions. For said purpose a wake-up RNTI (WU-RNTI) is introduced, such that when a PDCCH message is scrambled with the WU-RNTI, this would instruct the UE to wake-up. As with the P-RNTI, there is only WU-RNTI for the mobile terminal in the system.

The paging and the wake-up mechanism is thus separated, which avoids unnecessary reception of the paging or wake-up message.

In the wake-up message transmitted in the paging occasion, a wakeUpRecordlist is added, similar to the normal paging message. The UE being in the DRX long cycle reads this wakeUpRecordlist, and if it find its identity (C-RNTI), it wakes up from DRX.

Figure 18:
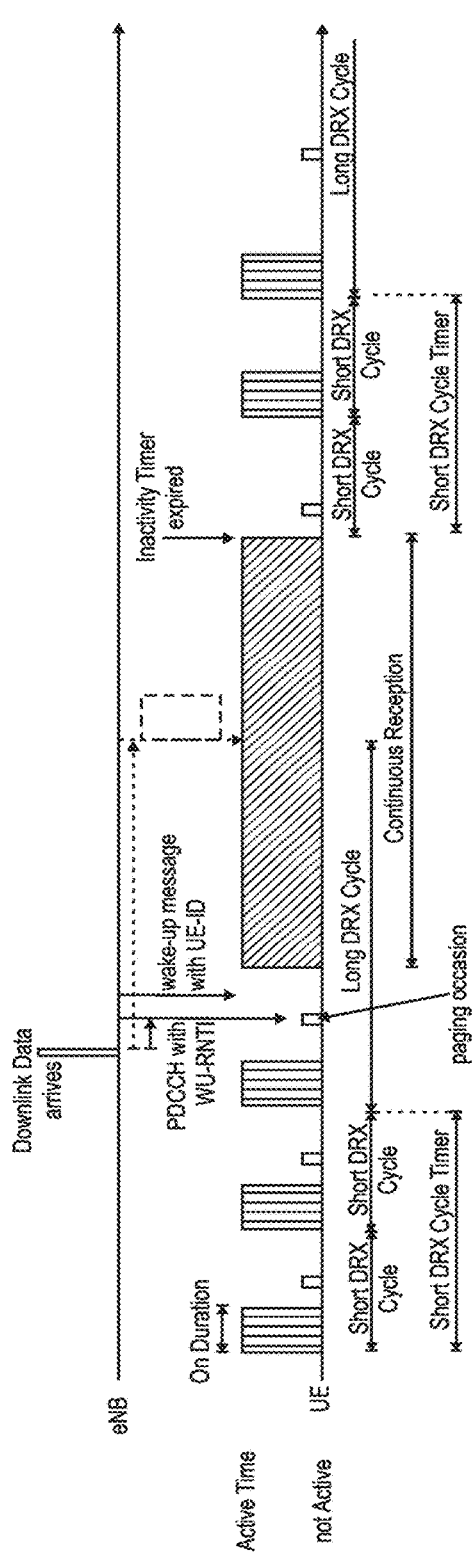
FIG. 18 illustrates the DRX operation according to another embodiment of the disclosure, where paging occasions of the mobile terminal are used to get a paging with a particular wake-up RNTI for wake-up opportunities.

This is illustrated in FIG. 18, illustrating various paging occasions, one of which is used by the eNodeB to transmit a PDCCH message using the WU-RNTI, after downlink data arrives for the UE. Correspondingly, the UE monitors the PDCCH for this message, decodes same and due to the WU-RNTI learns that it shall wake-up. After a defined time of subframes after the paging occurrence, the UE returns to Active Time and could, e.g., be scheduled. This gap is necessary to provide time for the paging message reception; at least 4 subframes; may also allow for 8 subframes, similar to the SCell activation. In this time the mobile terminal can receive the wake-up message from the eNodeB, which CRC is scrambled now with the C-RNTI of the mobile terminal. At the beginning of the procedure it is not possible for the mobile terminal to receive a data transmission, only the wake-up message.

The mobile terminal can thus be woken up by the eNodeB earlier than if only using the DRX long cycle. The exemplary difference is depicted in FIG. 18 using dashed lines. Furthermore, by reusing the paging mechanism the mobile terminal only needs to blindly decode one RNTI (besides the searching for the System Information change).

Alternatively, instead of monitoring the paging occasion for the WU-RNTI the mobile terminal can monitor the paging occasion for a PDCCH message masked with another RNTI assigned directly to the mobile terminal. This allows for a faster procedure for waking up the mobile terminal as no further checks as described above have to be performed as the RNTI is already specific to the mobile terminal. This alternative comes with the drawback of increasing PDCCHs during the paging occasion.

In another embodiment of the disclosure, the eNodeB configures the mobile terminal with persistent downlink assignments (SPS, semi-persistent scheduling), where the intervals is several times shorter than the DRX long cycle. SPS is activated during the Active Time. During DRX, the UE shall receive the POSCH on configured assignments, and decodes the transport block of these configured assignments.

In case the decoding of the transport block at the configured assignment fails, no HARQ operation is to be performed, and consequently, the mobile terminal does not wake up for re-transmissions (HARQ RTT not started). On the other hand, if the decoding of the transport block is successful, the mobile terminal returns to Active Time. It should be noted that a gap might become necessary to provide time for the transport block to be successfully decoded, before the UE can actually enter Active Time.

Figure 19:
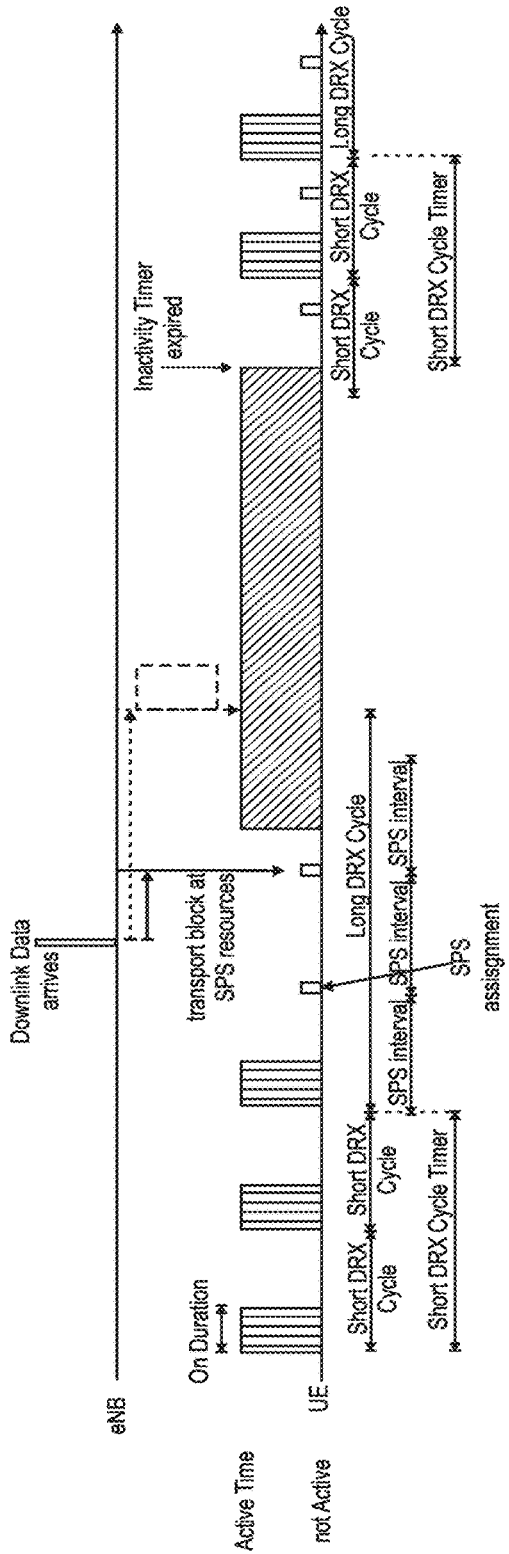
FIG. 19 illustrates the DRX operation according to another embodiment of the disclosure, where the SPS assignments are used to monitor the POSCH for a transport block.

The benefit of this embodiment is that it is implementation friendly since only changes to the SPS operation during DRX are required. However, there may be a delay between the configured assignment and the start of the Active Time. Also, additional signaling might be necessary, if SPS needs to be activated/deactivated before/after the DRX phase. Further, if SPS stay active during the Active Time, this would lead to a waste of downlink resources. FIG. 19 depicts the functioning of this embodiment of the disclosure.

Mobile terminals, and in particular smartphones create traffic from multiple application being active in the mobile terminal at the same time. Such a mix of application creates data traffic which is hard to predict. This is especially true on the RAN level, where the downlink data arriving in the eNodeB cannot be correlated with a specific application. Furthermore, applications have different delay requirements.

The network is in control of putting the mobile terminal in a state with more power saving (e.g., RRC_IDLE) or to keep the mobile terminal in active state. Correspondingly, the network has to weigh the mobile terminal's power consumption against the network's signaling load and basically has two choices.

At the cost of higher signaling load for the state transition and an increased delay, the mobile terminal's power saving is enhanced. At the cost of higher power consumption in the mobile terminal, network refrains from state transmission and the corresponding signaling thus reducing the signaling overhead, and avoids the delay introduced by being in idle.

Therefore, there is the problem that due to the unknown traffic pattern at network side, the mobile terminal is kept in active state longer than would be necessary; this is unnecessary from the mobile terminal's point of view, and wastes the mobile terminal's battery.

As explained in the background section Fast Dormancy was introduced by Release 8 of LTE.

One embodiment of the disclosure solves this problem differently.

The UE indeed has knowledge of the applications it is running, and thus may conclude from the active application, the expected data reception/transmission behavior on RAN layer. Therefore, the UE may predict the downlink traffic pattern, it will be scheduled with from the eNodeB.

The UE indicates the expected end of the downlink data to the eNodeB, in response to which the eNodeB may send a DRX MAC CE to the mobile terminal in order for the mobile terminal to enter the DRX mode. This avoids signaling overhead as the UE is kept in active state. A good power efficiency is achieved by the configuring the short and long DRX cycles appropriately. For example, the short DRX cycle may be configured to match the actual traffic, and the long DRX cycle may model the idle mode. The short and long DRX cycles may also be extended to cycle periods longer than currently allowed in the standardization (current 640 ms and 2560 ms, respectively), so as to achieve higher power efficiency.

According to a further embodiment of the disclosure, the eNodeB may indicate to the UE to directly operate according to the Long DRX cycle without operating according the Short DRX cycle first, in order to further save batter power in the UE. This could be implemented for example by changing the MAC DRX CE to not only include the command for "go-to-sleep" but also the indication of "immediate transition from short to long DRX cycle".

The indication of the expected end of the downlink data to the eNodeB can be implemented according to one of the following.

The indication could be done via RRC signaling, like in HSPA fast dormancy. Alternatively, a new MAC control element could be defined, using one of the currently reserved LCIDs; no payload is thus necessary for indicating the expected end of the downlink data. Or, the indication can be inserted into the Buffer Status Report (BSR).

In the MAC header for the short and/or long BSR, one of the reserved bits is used to indicate that the UE expects the end of downlink data. In this case, the indication will only be sent if a BSR is triggered; thus, the triggering rule may need to be changed.

A further alternative embodiment relates to sending the indication in the CQI report. When the UE is configured with periodic CQI reporting, the mobile terminal can set an "out of range" value, when reporting, e.g., the wideband CQI.

Furthermore, in one embodiment the measurements on the activated SCells do not follow the DRX long cycle but the parameter measCycleSCell usually employed for deactivated SCells. The measCycleSCell is configurable to 160, 256, 320, 512, 640, 1024 and 1280 subframes. The UE is configured to measure once within 5 times the measCycleSCell. This allows further relaxed measurement requirements for the UE with further power saving.

Hardware and Software Implementation of the Disclosure

Another embodiment of the disclosure relates to the implementation of the above described various embodiments using hardware and software. In this connection the disclosure provides a user equipment (mobile terminal) and a eNodeB (base station). The user equipment is adapted to perform the methods described herein. Furthermore, the eNodeB comprises means that enable the eNodeB to evaluate the IPMI set quality of respective user equipments from the IPMI set quality information received from the user equipments and to consider the IPMI set quality of the different user equipments in the scheduling of the different user equipments by its scheduler.

It is further recognized that the various embodiments of the disclosure may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the disclosure may also be performed or embodied by a combination of these devices.

Further, the various embodiments of the disclosure may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the disclosure may individually or in arbitrary combination be subject matter to another disclosure.

It would be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects to be illustrative and not restrictive.

What is claimed is:

1. One or more non-transitory, computer-readable media having instructions that, when executed by one or more processors, cause a device to:
   configure a short discontinuous reception (DRX) cycle, a DRX short cycle timer, and a long DRX cycle that is to follow the short DRX cycle after expiration of the DRX short cycle timer;
   start the short DRX cycle based at least in part on receipt of a medium access control (MAC) control element from a base station or expiration of an inactivity timer;
   receive a discontinuous reception (DRX) command MAC control element; and
   transition from the short DRX cycle to the long DRX cycle based at least in part on receipt of the DRX command MAC control element.

2. The one or more non-transitory, computer-readable media of claim 1, wherein the instructions, when executed, further cause the device to:
   receive the DRX command MAC control element from a base station.

3. The one or more non-transitory, computer-readable media of claim 1, wherein the instructions, when executed, further cause the device to:
transmit, to a base station, an indication of an expected end of downlink data.

4. The one or more non-transitory, computer-readable media of claim 1, wherein the instructions, when executed, further cause the device to:
receive configuration information from a base station; and
configure the short DRX cycle, the DRX short cycle timer, or the long DRX cycle based on the configuration information.

5. The one or more non-transitory, computer-readable media of claim 1, wherein the instructions, when executed, further cause the device to:
configure an additional DRX cycle;
start the additional DRX cycle in parallel to the short DRX cycle or the long DRX cycle; and
monitor a downlink control channel for messages destined to the device based at least in part on the additional DRX cycle.

6. The one or more non-transitory, computer-readable media of claim 1, wherein the instructions, when executed, further cause the device to:
repeatedly use the long DRX cycle until a scheduling message is received from a base station.

7. The one or more non-transitory, computer-readable media of claim 1, wherein the instructions, when executed, further cause the device to:
monitor a physical downlink control channel (PDCCH) by discontinuously using the short DRX cycle and the long DRX cycle.

8. The one or more non-transitory, computer-readable media of claim 1, wherein the instructions, when executed, further cause the device to:
stop the DRX short cycle timer based at least in part on receipt of the DRX command MAC control element.

9. A method of operating a base station, the method comprising:
transmitting configuration information to a mobile terminal to configure a short discontinuous reception (DRX) cycle, a DRX short cycle timer, and a long DRX cycle, wherein the short DRX cycle is to start based at least in part on the mobile terminal receiving a medium access control (MAC) control element or expiration of an inactivity timer, and the long DRX cycle is to follow the short DRX cycle after expiration of the DRX short cycle timer; and
transmitting a discontinuous reception (DRX) command MAC control element to command the mobile terminal to transition from the short DRX cycle to the long DRX cycle.

10. The method of claim 9, further comprising:
determining an expected end to downlink data for the mobile terminal; and
transmitting the configuration information or the DRX command MAC control element based at least in part on the expected end to the downlink data.

11. The method of claim 10, further comprising:
receiving, from the mobile terminal, an indication of the expected end of the downlink data.

12. The method of claim 10, wherein the configuration information is to configure an additional DRX cycle that is to be used by the mobile terminal to detect a downlink control channel message in parallel to the short DRX cycle or the long DRX cycle.

13. The method of claim 10, wherein the configuration information is to configure the mobile terminal to repeat using the long DRX cycle until a scheduling message is transmitted from the base station.

14. An apparatus comprising:
memory to store configuration information received from a base station; and processing circuitry coupled with the memory, the processing circuitry to:
configure, based on the configuration information, a short discontinuous reception (DRX) cycle, a DRX short cycle timer, and a long DRX cycle that is to follow the short DRX cycle after expiration of the DRX short cycle timer;
start the short DRX cycle based at least in part on receipt of a medium access control (MAC) control element from the base station or expiration of an inactivity timer; and
transition from the short DRX cycle to the long DRX cycle based at least in part on receipt of a discontinuous reception (DRX) command MAC control element.

15. The apparatus of claim 14, wherein apparatus further comprises:
receive circuitry to receive the DRX command MAC control element from the base station.

16. The apparatus of claim 14, further comprising:
transmit circuitry to transmit, to the base station, an indication of an expected end of downlink data.

17. The apparatus of claim 14, further comprising:
a receiver to receive the configuration information from the base station.

18. The apparatus of claim 14, wherein the processing circuitry is further to:
configure an additional DRX cycle;
start the additional DRX cycle in parallel to the short DRX cycle or the long DRX cycle; and
monitor a downlink control channel for messages destined to the apparatus based at least in part on the additional DRX cycle.

19. The apparatus of claim 14, wherein the processing circuitry is further to:
repeatedly use the long DRX cycle until a scheduling message is received from the base station.

20. The apparatus of claim 14, wherein the processing circuitry is further to:
stop the DRX short cycle timer based at least in part on receipt of the DRX command MAC control element.

* * * * *